US012543121B2

(12) United States Patent
Soulier et al.

(10) Patent No.: US 12,543,121 B2
(45) Date of Patent: Feb. 3, 2026

(54) METHOD FOR OPERATING A BLUETOOTH DEVICE

(71) Applicant: Google LLC, Mountain View, CA (US)

(72) Inventors: Antoine Soulier, Carrieres sur Seine (FR); Thomas Girardier, Bourg la Reine (FR)

(73) Assignee: GOOGLE LLC, Mountain View, CA (US)

( * ) Notice: Subject to any disclaimer, the term of this patent is extended or adjusted under 35 U.S.C. 154(b) by 431 days.

(21) Appl. No.: 17/607,728

(22) PCT Filed: May 29, 2020

(86) PCT No.: PCT/EP2020/064993
§ 371 (c)(1),
(2) Date: Oct. 29, 2021

(87) PCT Pub. No.: WO2020/239985
PCT Pub. Date: Dec. 3, 2020

(65) Prior Publication Data
US 2022/0248333 A1    Aug. 4, 2022

(30) Foreign Application Priority Data

May 31, 2019   (EP) ..................................... 19305702
Nov. 26, 2019  (EP) ..................................... 19306521

(51) Int. Cl.
*H04L 29/06*       (2006.01)
*G10L 19/16*       (2013.01)
(Continued)

(52) U.S. Cl.
CPC ....... *H04W 52/0277* (2013.01); *G10L 19/167* (2013.01); *H04W 4/80* (2018.02); *H04W 52/0254* (2013.01); *H04W 84/20* (2013.01)

(58) Field of Classification Search
None
See application file for complete search history.

(56) References Cited

U.S. PATENT DOCUMENTS 8,224,247 B2   7/2012  Kidron et al.
8,483,699 B1   7/2013  Oroskar
(Continued)

FOREIGN PATENT DOCUMENTS

CN    101977272 A    2/2011
CN    106231478 A    12/2016
(Continued)

OTHER PUBLICATIONS

Extended European Search Report for European Patent Application No. 22157062.5 dated May 19, 2022. 13 pages.
(Continued)

*Primary Examiner* — Gary Lafontant
(74) *Attorney, Agent, or Firm* — DORITY & MANNING P.A.

(57) ABSTRACT

The present invention relates to the field of wireless audio streaming. The invention can be used to manage dynamically the configuration of a link between a Bluetooth audio source and a Bluetooth audio sink, or between a master and slave device. The invention relates to method for operating a Bluetooth device, the method comprising: transporting audio information over a Bluetooth communication link established with a second device; determining, upon a change of value of an operational parameter in either the Bluetooth device or the second device, a new operating mode for said Bluetooth communication link; modifying a configuration parameter of said Bluetooth communication link based on the new operating mode; transporting audio information on said Bluetooth communication link according to the modified configuration parameter.

16 Claims, 19 Drawing Sheets

(51) Int. Cl.
*H04W 4/80* (2018.01)
*H04W 52/02* (2009.01)
*H04W 84/20* (2009.01)

(56) References Cited

U.S. PATENT DOCUMENTS

| | | |
|---|---|---|
| 9,544,718 B2 | 1/2017 | Song et al. |
| 9,756,455 B2 | 9/2017 | Kawabe et al. |
| 10,212,569 B1 | 2/2019 | Huang et al. |
| 10,701,538 B1 | 6/2020 | Elliot et al. |
| 2002/0072816 A1 | 6/2002 | Shdema et al. |
| 2005/0119827 A1 | 6/2005 | Willer et al. |
| 2006/0036436 A1 | 2/2006 | Halcrow et al. |
| 2008/0133227 A1 | 6/2008 | Kong et al. |
| 2008/0287063 A1 | 11/2008 | Kidron et al. |
| 2009/0076825 A1 | 3/2009 | Bradford et al. |
| 2010/0122005 A1 | 5/2010 | Kong et al. |
| 2010/0150383 A1 | 6/2010 | Sampat |
| 2010/0195539 A1 | 8/2010 | Tian et al. |
| 2010/0303244 A1 | 12/2010 | Kim et al. |
| 2011/0103593 A1 | 5/2011 | Sutharsan |
| 2012/0120857 A1 | 5/2012 | Sudak et al. |
| 2012/0290306 A1 | 11/2012 | Smyth et al. |
| 2014/0233356 A1* | 8/2014 | Pattikonda ........... G04G 9/0064 368/13 |
| 2015/0319557 A1 | 11/2015 | El-Hoiydi |
| 2016/0162015 A1 | 6/2016 | Moon |
| 2016/0205148 A1 | 7/2016 | Lee et al. |
| 2016/0249356 A1 | 8/2016 | Pope |
| 2016/0253997 A1 | 9/2016 | Kerr |
| 2016/0359925 A1* | 12/2016 | Song ................ H04L 65/1069 |
| 2017/0171697 A1 | 6/2017 | Song |
| 2018/0151187 A1 | 5/2018 | Sorensen et al. |
| 2018/0353855 A1 | 12/2018 | Niemeyer et al. |
| 2019/0311714 A1 | 10/2019 | Barbello et al. |
| 2020/0128291 A1 | 4/2020 | Morales et al. |

FOREIGN PATENT DOCUMENTS

| | | |
|---|---|---|
| CN | 107040848 A | 8/2017 |
| CN | 109661828 A | 4/2019 |
| CN | 107708192 B | 3/2021 |
| EP | 2292062 A1 | 3/2011 |
| EP | 2129170 B1 | 2/2012 |
| EP | 2773134 A1 | 9/2014 |
| EP | 3 319 331 A1 | 5/2018 |
| EP | 3318089 A1 | 5/2018 |
| JP | 2003309541 A | 10/2003 |
| JP | 2004040548 A | 2/2004 |
| JP | 2011-160161 A | 8/2011 |
| JP | 2018072213 A | 5/2018 |
| JP | 2018117393 A | 7/2018 |
| KR | 20140061221 A | 5/2014 |
| KR | 101510736 B1 | 1/2015 |
| KR | 20150142587 A | 12/2015 |
| KR | 20190016802 A | 2/2019 |
| KR | 20190033525 A | 3/2019 |

OTHER PUBLICATIONS

Liu Bo, "5.8GHz point-to-multipoint video transmission system," Chinese Radio Management, Issue 7, Jul. 26, 2003, 4 pages.
International Preliminary Report on Patentability for International Application No. PCT/EP2020/064993 dated Dec. 9, 2021. 8 pages.
Partial European Search Report for European Application No. 19306521.6 mailed Apr. 15, 2020, 12 pages.
Extended European Search Report for European Application No. 19306521.6 mailed Jul. 22, 2020, 15 pages.
Extended European Search Report for European Application No. 19305702.3 mailed Oct. 24, 2019, 8 pages.
ISR/WO for International Application No. PCTEP2020064993 mailed Jun. 23, 2020, 9 pages.

\* cited by examiner

METHOD FOR OPERATING A BLUETOOTH DEVICE

CROSS-REFERENCE TO RELATED APPLICATIONS

This application is a national phase entry under 35 U.S.C. § 371 of International Application No. PCT/EP2020/064993 filed May 29, 2020, which claims priority from European Patent Application No. 19306521.6 filed Nov. 26, 2019, and European Patent Application No. 19305702.3 filed May 31, 2019, all of which are hereby incorporated herein by reference.

BACKGROUND OF THE INVENTION

The present invention relates to wireless communication, and more specifically to a method for dynamically modifying configuration of a communication link between a Bluetooth source device and a Bluetooth multimedia (audio or video) sink device.

By "configuration", it is meant a set of parameters that determines how data are transmitted between the source device and the sink device. These parameters are referred to as "configuration parameters". By "modifying configuration", it is meant modifying one or several configuration parameters among the set of configuration parameters.

In one or several embodiments, the Bluetooth sink device may be a Bluetooth loudspeaker. By "loudspeaker", it is meant any electroacoustic transducer, which converts an electrical audio signal into a corresponding sound. The term "loudspeaker" includes for instance audio speakers of a stereo system, headphones, earbuds, hearing aids, etc. The audio source device (or simply "source device", or "source") may be, for instance, a mobile phone, a portable game player, a portable media player, a computer, a tablet, a television, a control device of a stereo system, etc. In the following, the source device may also be referred to as "master device".

Bluetooth is a communication standard that is well-known to the person skilled in the art, managed by a group of organizations (Bluetooth SIG) that has issued successive versions. Bluetooth enables a short-distance bidirectional exchange of data (this is a piconet network, which designates a network covering a personal zone). Therefore, the range of Bluetooth equipment is limited to a few tens of meters. Bluetooth uses radio waves that are situated in the UHF band (between 300 MHz and 3 GHz). Bluetooth aims to simplify connections between electronic devices by removing cable connections. Thus Bluetooth enables cables between a source multimedia device (hi-fi system, car radio, computer, tablet, mobile telephone, etc.) to be replaced by wireless communications and multimedia sink devices such as speakers arranged to play a received multimedia stream. Bluetooth speakers have met with a certain success due to their high portability.

In general, the configuration of a Bluetooth link between a source device and a sink device is determined when the connection is established, and is not modified after. For instance, the master device may send a request to obtain the audio capabilities of the sink device and, based on the response, select the suitable audio parameters of the link.

Some methods have been proposed in the prior art to adapt dynamically the audio bit rate based on the available Bluetooth bandwidth. For instance, U.S. Pat. No. 8,031,658 proposes to dynamically change the bit rate used in the Codec based on conditions of the Bluetooth connection. US 2013/0304458 relates to a source device wherein the controller is adapted for changing audio parameters based on the bandwidth between the communicating Bluetooth devices.

In other words, techniques of the prior only propose to dynamically adapt audio parameters based on connection parameters, in order to avoid audio choppiness and to improve the user experience.

However, there may be other situations in which it would be interesting to dynamically modify the configuration of the link, because the configuration adopted when establishing the connection between the Bluetooth devices may not be the most suitable in such situations.

An object of the present disclosure is therefore directed to a method for dynamically changing configuration (not only audio parameters) of a communication link between a Bluetooth source device and a Bluetooth multimedia sink device based on parameters that are not necessarily connection parameters.

SUMMARY OF THE INVENTION

The invention relates to a method for operating a Bluetooth device. The method may comprise:
- transporting audio information over a Bluetooth communication link established with a second device;
- determining, upon a change of value of an operational parameter in either the Bluetooth device or the second device, a new operating mode for said Bluetooth communication link;
- modifying a configuration parameter of said Bluetooth communication link based on the new operating mode;
- transporting audio information on said Bluetooth communication link according to the modified configuration parameter.

By "Bluetooth communication link", it is meant a communication link established according any Bluetooth protocol (as described for instance in the Bluetooth Core Specification version 5.1 or in earlier versions of the Bluetooth Core Specification), including Bluetooth BR/EDR (Bluetooth Basic Rate/Enhanced Data Rate), but also Bluetooth low energy (LE).

In one or several embodiments, the operational parameter may be associated with an operating system running on the Bluetooth device or the second device.

Alternatively, the operational parameter may be associated with an application running on the Bluetooth device or the second device.

In one or several embodiments, the modifying of the configuration parameter may be performed by a Bluetooth Host.

Alternatively, the modifying of the configuration parameter may be performed by a Bluetooth Controller.

In one or several embodiments, the operational parameter may be one of:
- a battery level,
- a type of application launched on the Bluetooth device or the second device,
- a reading mode of a multimedia content, or
- a quality of a multimedia content.

In one or several embodiments, the configuration parameter may be one of:
- an audio configuration parameter, or
- a Bluetooth connection parameter.

For instance, the configuration parameter may be one audio configuration parameter among:
- a type of codec,
- a parameter relative to a codec, a type of data,
an audio channel selection parameter, or
a sampling rate parameter.

Alternatively, the configuration parameter may be one Bluetooth connection parameter among:
a Flush Timeout parameter,
a channel type parameter,
a quality of service parameter,
a number of retransmission parameter,
a parameter among BLE link parameters,
a packet type parameter, and
a Maximum Transmission Unit, MTU, parameter.

Another aspect of the invention relates to a Bluetooth device. The Bluetooth device may comprise a Bluetooth chip, a processor and a memory configured to:
transport audio information over a Bluetooth communication link established with a second device;
determine, upon a change of value of an operational parameter in either the Bluetooth device or the second device, a new operating mode for said Bluetooth communication link;
modify a configuration parameter of said Bluetooth communication link based on the determined new operating mode;
transport audio information on said Bluetooth communication link according to the modified configuration parameter.

In one or several embodiments, the operational parameter may be associated with an operating system of the Bluetooth device or the second device.

Alternatively, the operational parameter may be associated with an application running on the Bluetooth device or the second device.

In one or several embodiments, the Bluetooth device may further comprise a Bluetooth Controller and the modifying of the configuration parameter may be performed by the Bluetooth Controller.

The Bluetooth device may further comprise a Bluetooth Host, and, alternatively, the modifying of the configuration parameter may be performed by the Bluetooth Host.

In one or several embodiments, the operational parameter may be one of:
a battery level,
a type of application launched on the Bluetooth device or the second device,
a reading mode of a multimedia content, or
a quality of a multimedia content.

In one or several embodiments, the configuration parameter may be one of:
an audio configuration parameter, or
a Bluetooth connection parameter.

For instance, the operational parameter may be one audio configuration parameter among:
a type of codec,
a parameter relative to a codec,
a type of data,
an audio channel selection parameter, or
a sampling rate parameter.

Alternatively, the operational parameter may be one Bluetooth connection parameter among:
a Flush Timeout parameter,
a channel type parameter,
a quality of service parameter,
a number of retransmission parameter,
a parameter among BLE link parameters,
a packet type parameter, and
a Maximum transmission unit, MTU, parameter.

Another aspect relates to a non-transitory computer readable storage medium, having stored there on a computer program comprising program instructions, the computer program being loadable into a data-processing unit and adapted to cause the data-processing unit to carry out the steps of the above method when the computer program is run by the data-processing device. Types of non-transitory computer readable storage medium used in certain embodiments of the invention include magnetic hard disk drives (HDD), fixed optical storage media, field programmable gate arrays (FPGA), programmable read-only memory (ROM) or flash-RAM devices. These non-transitory computer readable storage medium may be stand-alone or part of a larger Bluetooth enabled system.

In another aspect of the invention a Bluetooth source device conducts a Bluetooth communication link with a Bluetooth sink device. The Bluetooth source device also performs the steps of detecting a change an operational parameter, modifying a configuration parameter of the communication link based on the change of the operational parameter and transmitting audio information over the communication link according to the configuration parameter. The modification of the configuration parameter may, for example, be performed via transmission of configuration messages to a Bluetooth sink device.

Additionally, the detection of the change in an operational parameter may be performed, for example, via exchange of information with the operating system and/or and applications running on the Bluetooth source device. Alternatively, the Bluetooth source device may detect the change of an operational parameter via messages received from the Bluetooth sink device including the operational parameters described herein or messages that indicate low battery power, switching off a left or right speaker, a change in the acoustic conditions, or switching between stereo or mono modes.

In another aspect of the invention a Bluetooth sink device performs the steps of communicating via a Bluetooth link, detecting a local change in an operational parameter, changing a configuration parameter of the Bluetooth link and then transmission of audio information via the Bluetooth link. The Bluetooth sink device may indicate the change in the operational parameter to a Bluetooth source device via messaging and then may change the configuration parameter in response to control messages from the Bluetooth source device, or it may determine the preferred configuration parameter and then send messages that perform the desired configuration change.

In another aspect of the invention, hardware and circuits are provided that performs the various steps described herein. For example, the Bluetooth device may include a Bluetooth chip configured to establish a communication link with a second Bluetooth device, a detection circuit for detecting a change of a value of an operational parameter, a determining circuit for determining, based on the operational parameter, a configuration parameter for an established communication link, and a modifying circuit for modifying a configuration parameter of said established communication link based on the determined operating mode.

In still another aspect of the invention, the Bluetooth device includes a Bluetooth interface module for transmitting audio information to a second device, said Bluetooth interface module including a radio frequency processing circuit for converting signals received from the second device into incoming digital data, and for converting outgoing digital data into signals that are transmitted to the second device, battery for storing power and having a power level, battery monitoring circuit for detecting the power level of the battery, processor for running an operating system layer including an application monitoring process, and a Bluetooth controlling process. Additionally, the Bluetooth controlling process performs the steps of establishing a wireless link with the second device using the radio frequency processing unit, the link having a first configuration, monitoring operational parameters of the audio related information being transmitted over the wireless link and changing a configuration parameter of the link in repose to a change in the operational parameters.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

Figure 1:
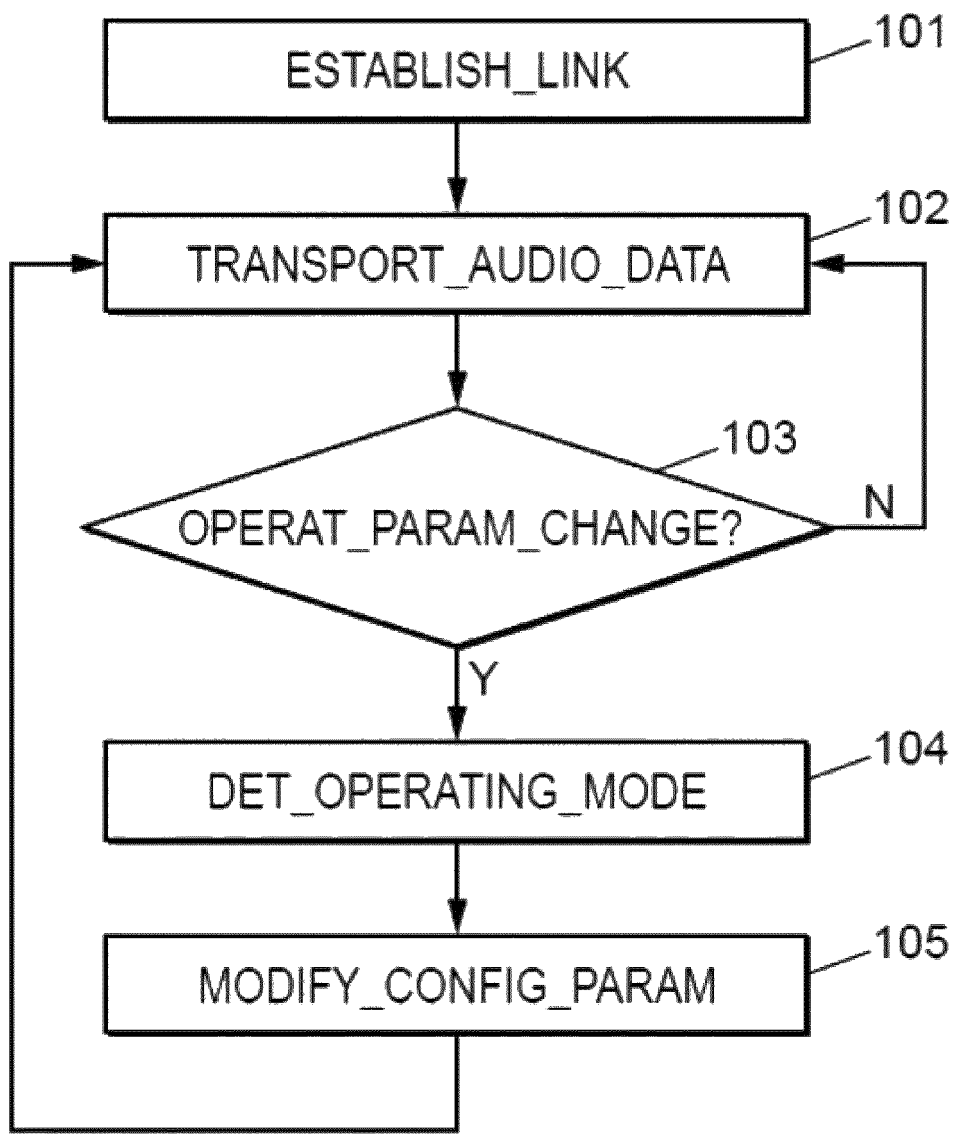
FIG. 1 is a flow chart describing a possible embodiment of the present invention.

FIG. 1 is a flow chart describing a possible embodiment of the present invention.

The steps of the flow chart of FIG. 1 may be performed by the master device and/or by the sink device.

In a first step 101, a wireless communication link is established between the master device and the sink device. This wireless communication link may be a Bluetooth link using the Advanced Audio Distribution Profile (A2DP) constructed from several layers defined by the Bluetooth standard.

Audio information is therefore transported 102 over the established communication link. For instance, the audio information may be an audio or a stereo stream including packets incorporating audio data.

The device implementing the method may further be configured to detect 103 a change of an operational parameter of at least one Bluetooth device among the master device and the sink device.

This change may occur on the side of the master device or on the side of the sink device, whatever the device implementing the method. For instance, the master device may detect a change of one of its operational parameter, but also a change of an operational parameter of the sink device.

As long as no change of an operational parameter is detected (step 103, "N"), the configuration of the wireless communication link between the master device and the sink device is not modified and audio data continues to be transported 102 on this communication link, according to this configuration.

When a change of an operational parameter is detected (step 103, "Y"), a new operating mode is determined 104 for the communication link between the master device and the sink device.

The configuration of the communication link is then changed based on the determined operating mode, for the data to be transmitted between the master device and the source device according to this operating mode. To this purpose, at least one configuration parameter of the communication link is modified 105. The audio data is then sent/received 102 on this reconfigured link.

By "operational parameter" of a Bluetooth device, it is meant a parameter relating to the operation of the Bluetooth device, for instance a parameter relating to the operating system running on the Bluetooth device.

In one or several embodiments, the operational parameter of a Bluetooth device may be associated with an application running on the Bluetooth device. In that case, the Bluetooth device is usually the master device, i.e. the operational parameter is associated with an application running on the master device. For instance, such parameter may be a type of application (gaming, video or audio streaming, etc.) launched or ended on the Bluetooth device, or a specific application launched on the Bluetooth device (e.g. the user is using Spotify® and launches Youtube® on his smartphone).

Indeed, it may be advantageous to modify the configuration of the link when using a specific application or a specific type of application. For example, two streaming applications may not have the same sampling rates, and it may be advantageous to reconfigure the Bluetooth audio link so its sampling rate matches the one of the applications currently launched on the Bluetooth device (and therefore avoid resampling before sending the audio packets). According to another example, a gaming application may require to activate a low latency mode.

In one or several embodiments, the operational parameter may be related to a multimedia content played by a Bluetooth device, which is usually the master device. For instance, the operational parameter may be a reading mode of the multimedia content (e.g. mono/stereo). Alternatively or in addition, the operational parameter may be a quality of the multimedia content (e.g. compression level, High/Standard/Low Definition, etc.).

In one or several embodiments, the operational parameter may be a parameter related to a physical component of the master device or of the sink device, for example a battery level.

By "operating mode", it is meant a mode relating to a hardware component of one of the master device and the sink device, or a mode for transmitting data from one device to another. For instance, the operating mode may be relating to a power consumption of the master or the sink device (e.g. a power-saving mode), to a quality of the content (e.g. High-Quality mode), to a latency, etc.

The "configuration" of a communication link between a source device and a sink device corresponds to a set of configuration parameters that determines how data are transmitted between the source device and the sink device. These configuration parameters may comprise Bluetooth connection parameters associated with the wireless communication link, and applicative parameters.

By Bluetooth connection parameters, it is meant parameters related to low-level building blocks defined by the Bluetooth standard, such as the "Baseband" building block, the "LMP" ("Link Manager Protocol") building block, the "L2CAP" ("Logical Link Control and Adaptation Protocol") building block, or the "SDP" ("Service Discovery Protocol"). For instance, the Bluetooth parameters may include the number of retransmission, the packet type, the MTU, the FTO (or "Flush Timeout") value, which defines the expiration period for a data packet in a buffer memory of a source device, a QoS ("Quality of service") parameter, which defines the maximum latency between the inclusion of a packet to be transmitted in a L2CAP channel and its effective transmission, etc.

By applicative parameters it is meant parameters related to a chosen application, i.e. related to the application layer. In the Bluetooth standard, audio transmission is defined by the Advanced Audio Distribution Profile (A2DP). The A2DP profile is based on the Audio/Video Distribution Transport Protocol (AVDTP) building block which defines the procedures between Bluetooth devices for establishing the audio stream, negotiating the audio stream parameters and transmitting the audio stream data. Therefore, in case of audio transmission, the applicative parameters may be audio configuration parameters and may comprise:

- the type of coder/decoder (Codec) to be used for encoding audio data to be sent or for decoding received audio data: according to the Bluetooth protocol, SBC (for "Low Complexity Subband Codec") is the only codec that has to be supported by any Bluetooth device, but other Codecs may be used, such as AAC (for "Advanced Audio Coding"), LDAC or Apt-X. The choice of the type of codec may improve or decrease the audio content quality;
- parameters relative to the Codec: for example, the bit rate, the channel configuration (mono, stereo or joint-stereo), etc.;
- the type of audio data to transmit for each audio channel: for instance, "Left", "Right", or a combination of both (for instance (Left+Right)/2);
- the sampling rate;
- etc.

It is noted that the determination of the new operating mode in case of a change of an operational parameter may be triggered automatically (e.g. if the battery level is under a predefined threshold or if the derivative of the battery level is under a predefined threshold, the saving-power mode is automatically activated), or manually, by a user action (e.g. when a user starts a game, a "gaming mode" may be activated, or when a user ends a game, the operating mode may switch from a "gaming mode" into a "standard mode").

The modification of configuration of the communication link based on the determined operating mode may be done in several ways. In one or several embodiments, the "reconfigure command" of AVDTP (defined in the AVDTP specification) may be used. This command allows devices participating within a stream to change Application Service Capabilities.

For instance, the following procedure may be used. First, a "Suspend Streaming Procedure" may be performed for suspending the stream. Then, a Reconfigure Command may be used for changing current capability settings. After the reconfiguration, the streaming may be restarted by using the "Start Streaming Procedure".

Other techniques may be used for reconfiguring the communication link, which do not require suspending the streaming procedure (for instance by changing the bitpool of the SBC codec to reduce the bitrate). Thus, the communication link is dynamically reconfigured without interrupting the streaming.

For illustration purposes only, some examples of the method of FIG. 1 are provided below. Some of these examples are based on the table below, presenting different possible operating modes.

TABLE 1

Examples of operational modes

| Operational parameters | Operating Mode | Link configuration |
|---|---|---|
| Battery low event on the master or slave, or user manual input | Power-saving mode | Low complexity codec, low bitrate, bursty packet scheduling |
| Start of a tagged gaming or real-time video application (PUBG, Fortnite), or user manual input | Low-latency mode | Low-latency codec, few retransmissions, precise packet scheduling to avoid bursts |
| Start of a tagged audio application (Spotify, Apple Music), or user manual input | High-Quality mode | High-Quality codec, maximal bitrate, maximum retransmissions |
| End of a previous operating mode (end of a gaming/audio application, battery not low) | Standard mode | Default configuration |

It is assumed that a wireless communication link is already established 101 and used to transport 102 audio data.

In a first example, the operational parameter is a battery level (of the master device or of the sink device). At step 103, the Bluetooth device performing the method may determine that the battery level falls under a predefined threshold. At step 104 it is determined that the current operating mode of the communication link may be modified into a "power-saving mode". In consequence, at least one of the following configuration parameters may be modified (step 105):

- a codec complexity: for example, a codec having a lower complexity, i.e. based on codec compression techniques requiring less processing power, may be used;
- a codec bit rate: for example, a codec having a lower bit rate may be used;
- a packet scheduler: for example, a packet scheduler adapted for bursty traffic may be used. By "bursty traffic" it is meant that the scheduler of the master device buffers more audio data before sending it in one large packet or multiple successive packets, thus allowing the chipset of the earbuds/smartphone to sleep in between (for instance using the sniff or hold mode of the Bluetooth protocol).

Other configuration parameters may be modified (step 105), for instance one parameter among:

- a data rate of audio information transmitted over the wireless communication link,
- a sampling rate of audio information transmitted over the wireless communication link;
- any audio configuration parameter for audio data transmitted over the wireless communication link: for instance, a codec type, a codec related parameter, a data type, an audio channel selection parameter, a sampling rate parameter, etc.

In another example, the operational parameter is a type of application. When it is detected at step 103 that the type of application launched on the master device is a gaming or real-time video application, it may be determined at step 104 that the current operating mode of the communication link may be modified into a "low-latency mode". In consequence, at least one of the following configuration parameters may be modified (step 105):

a codec latency: a codec with a low latency may be used. This may be achieved, for instance, by using a codec with high quality (and high bandwidth), i.e. associated with a high Mean Opinion Score (MOS), like G.711, since such codec is usually configured to incur the least encode-decode latency;

a number of retransmissions: this number may be chosen to be small;

a packet scheduler: for example, a packet scheduler adapted for avoiding bursty traffic may be used for the master device. Such scheduler prefers small packets to be sent just in time, to avoid having to buffer too much (which would increase latency).

Still in the case where the operational parameter is a type of application, when it is detected at step 103 that a type of application (e.g. gaming, audio or real-time video application) is ended on the master device, it may be determined at step 104 that the current operating mode of the communication link may be switched into a "standard mode", with default configuration parameters.

Such "standard mode" may also be used in the case where the operational parameter is a battery level, and when it is detected at step 103 that the battery level again exceeds a predefined threshold.

In yet another example, the operational parameter is a specific audio application (Spotify®, Apple Music®). When it is detected at step 103 that one specific audio application is started on the master device, it may be determined at step 104 that the current operating mode of the communication link may be switched into a "high-quality mode". In consequence, at least one of the following configuration parameters may be modified (step 105):

a codec quality: a codec with high quality (and high bandwidth), i.e. associated with a high MOS, may be used;

a codec bit rate: for example, a codec having a maximal bit rate may be used;

a number of retransmissions: this number may be chosen to be maximal.

According to yet another example, when the change 103 of an operational parameter corresponds to a change in an audio source from a highly compressed source to a less compressed source, the modification 105 of a configuration parameter may comprise:

changing a codec configuration parameter from higher compression to a lower compression and increasing a throughput parameter for the wireless communication link; and/or increasing the MTU for the wireless communication link.

According to yet another example, when the master device is a smartphone and the slave system 201 comprises two earbuds, the change 103 of an operational parameter may correspond to a change in the local source of audio data from a higher quality source to a lower quality source. The wireless communication link may then be reconfigured from a higher quality link with a higher data rate to a lower quality link having a reduced data rate in response to the change.

FIGS. 2, 3, 4 and 5 represent different possible embodiment of the present invention.

Figure 2:
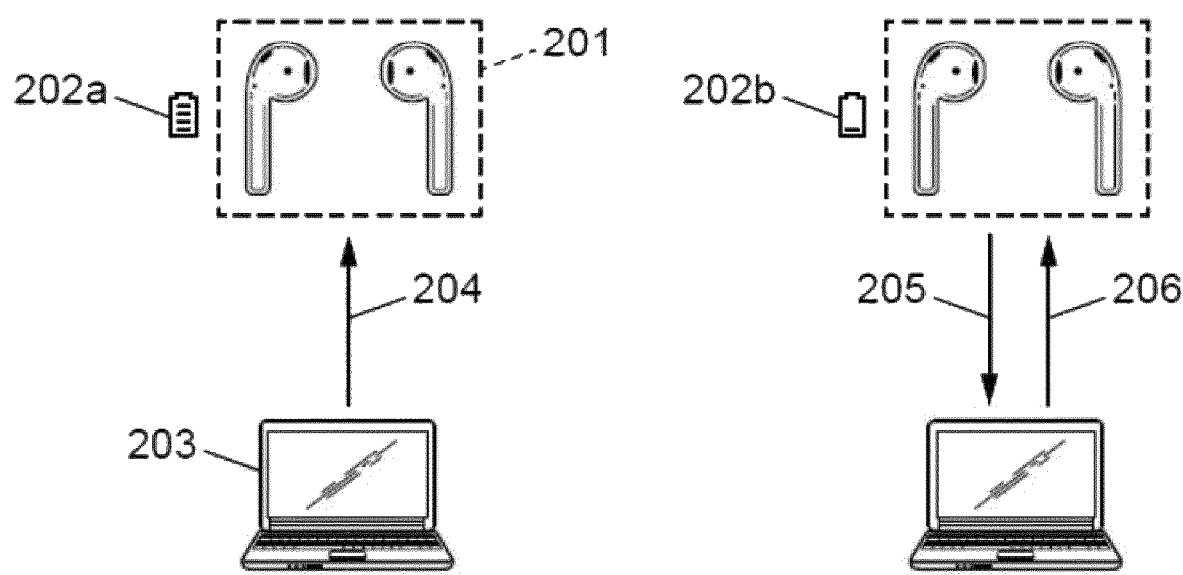
FIG. 2 is a representation of a first possible embodiment of the present invention.
Figure 3:
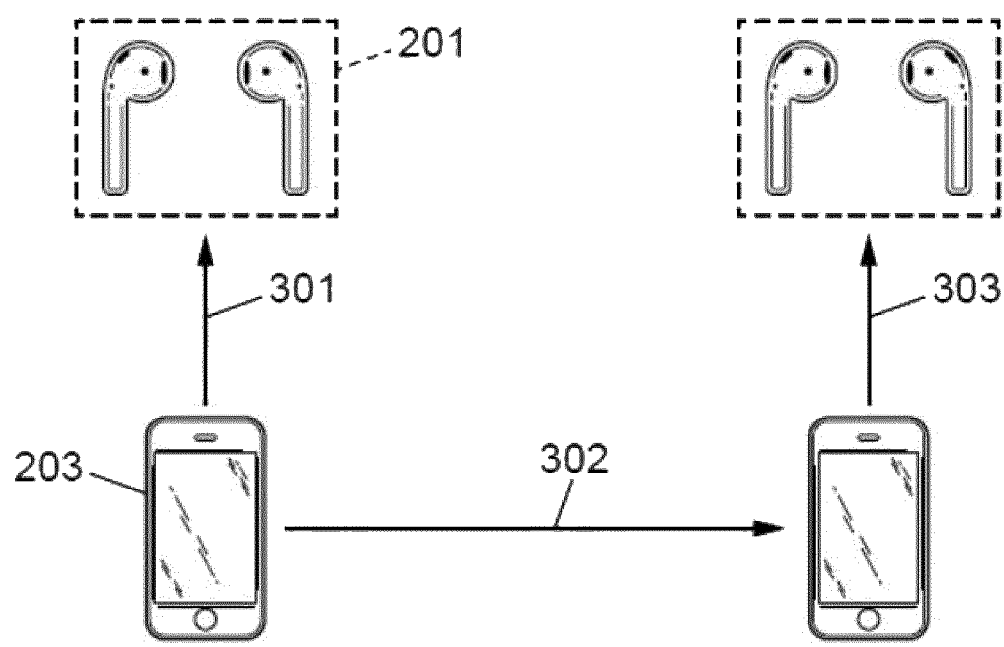
FIG. 3 is a representation of a second possible embodiment of the present invention.
Figure 4:
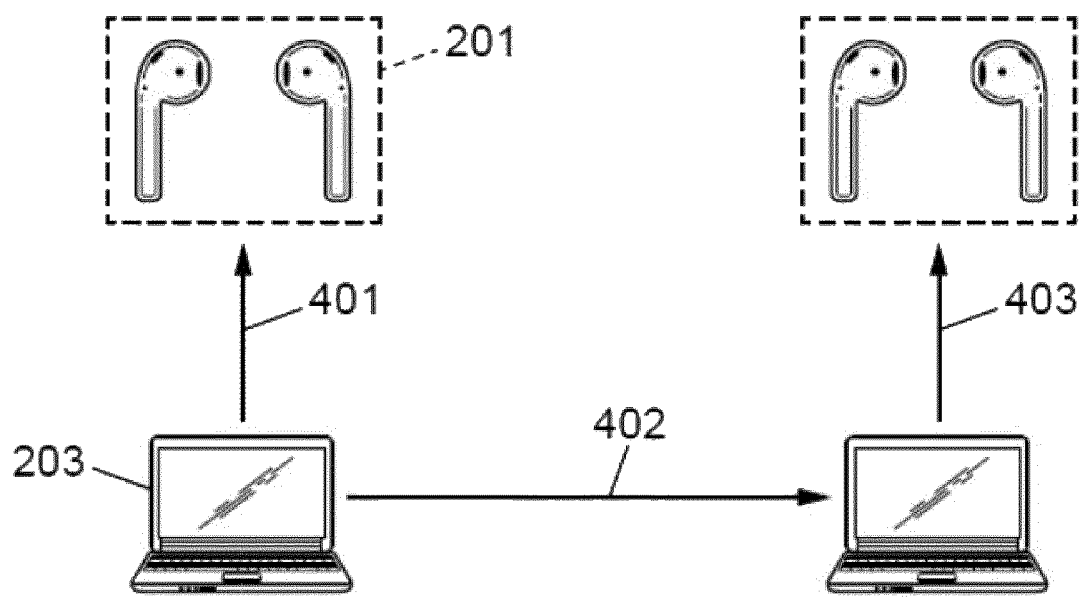
FIG. 4 is a representation of a third possible embodiment of the present invention.

In FIGS. 2, 3 and 4, the master device 203 may be an audio or video source device such as a computer, a tablet device or a smartphone. The master device 203 may be connected to a slave system 201 comprising at least one sink device. The slave system may be for instance a Bluetooth earbud/earphone, a pair of Bluetooth earbuds/earphones, a Bluetooth loudspeaker or a plurality of Bluetooth loudspeakers.

When there is a plurality of sink devices (e.g. a pair of earbuds), the master device 203 may comprise a Bluetooth chip (not represented in FIG. 2) arranged to generate several SEPs to control the sink devices 201 by creating a point-to-multipoint link between the master device 203 and the plurality of sink devices 201. For instance, the Bluetooth chip may generate a distinct Source SEP for each Sink SEP (corresponding to each Bluetooth sink device that it must control). This configuration seemingly consists in point-to-point links, from the source 203 to each of the sink devices 201. For example, and for this implementation, it is referred to application EP17182123.4, which proposes a Bluetooth chip configured to implement a modified A2DP profile so as to create such point-to-multipoint link. In such embodiment, each link from the master device 203 to each of the sink devices may be reconfigured.

Of course, other solutions may be used for controlling a plurality of sink devices 201 from a master device 203.

For instance, a chained connection may be established between the master device 203, a first earbud and a second earbud (in case of a pair of earbuds 201). The first earbud may be connected to the master device 203 according to a first wireless link, for instance a Bluetooth link using the Advanced Audio Distribution Profile (A2DP). A stereo stream including packets incorporating stereo data for both left and right channels may be transmitted from the master device 203 to the first earbud. The first earbud may be configured:

to play only the audio data relative to one of the two channels (for instance, the left channel), and to send the mono audio data relative to the other channel to the second earbud, via a second wireless link, which may be for instance a Bluetooth link (for instance, True Wireless Stereo), or a Near Field Magnetic Induction (NFMI) link.

Another solution may consist in a wireless link from the master device 203 to one of the two earbuds, while the other earbud is configured to "sniff" (or "snoop") the wireless link. According to this solution, the first earbud may be connected to the master device 203 according to a first wireless link, for instance a Bluetooth link using the Advanced Audio Distribution Profile (A2DP). A stereo stream including one or more packets incorporating stereo data for both left and right channels may be transmitted from the master device 203 to the first earbud. On the other hand, the first earbud may be connected to the second earbud according to a second wireless link (a Bluetooth link for instance). The first earbud and the second earbud can exchange some parameters, including sniffing/decoding parameters for allowing the second earphone to sniff the first link and to retrieve the audio data relative to the right channel. However, no audio data is exchanged via the second link. According to this solution, the second earbud is not connected to the master device 203, and is configured to sniff the first wireless link.

In one or several embodiments, the master device 203 may be configured for transmitting audio information to a slave device 201 and may comprise:

a radio frequency processing circuit for converting signals received from the slave device 201 into incoming digital data, and for converting outgoing digital data into signals that are transmitted to the slave device 201, the outgoing digital data including audio-related information;

a battery for storing power and having a power level;

a battery monitoring circuit for detecting the power level of the battery;

a processor for running an operating system layer including an application monitoring process and a Bluetooth controlling process, said controlling process being configured to perform the operating method of the present invention.

For instance, the master device 203 may be a Smartphone for transmitting audio information to a pair of earbuds 201, the earbuds comprising a left earbud and a right earbud, the master device comprising:

a radio frequency unit for receiving signals from the earbuds and for transmitting signals to the earbuds;

a battery for storing power and having a power level;

a battery monitoring unit for detecting the power level of the battery;

a processor unit for running an operating system layer including an application monitoring process and a Bluetooth controlling process, said controlling process being configured to perform the operating method of the present invention.

FIG. 2 is a representation of a first possible embodiment of the present invention.

The slave system 201 may be configured for supporting different types of codecs (e.g. SBC, LDAC, Apt-X, etc.), wherein each codec may be associated to one or several possible bit rates (e.g. LDAC at 990 kbits/s, kbps, or 660 kbps). Alternatively, the slave system 201 may be configured for supporting one type of codec, at different possible bit rates.

The slave system 201 has a battery level 202a, 202b and is configured to send a low battery signal to the master device 203 when the battery level 202a, 202b falls under a predefined threshold (e.g. 20% of the maximum battery level). For instance, the low battery signal may be sent by using a BLE (Bluetooth Low Energy) transmission or AVRCP (Audio/Video Remote Control Profile) profile.

In this embodiment, the operational parameter is the battery level 202a, 202b, of the slave system 201. The fact that the battery level 202a, 202b falls below the predefined threshold corresponds to the change of the operational parameter, as defined above with reference to FIG. 1. The new operating mode may be a power-saving mode, and the reconfiguration of the link (or the links in case of point-to-multipoint transmission) may include modifying the type of codec and/or the bit rate (e.g. reducing the bit rate).

According to an example, while the battery level 202a of the slave system 201 is above a predefined threshold, the master device 203 may send 204 to the slave system 201 audio packets processed via a first codec type (e.g. stereo LDAC at 990 kbps). When the battery level 202b of the slave system 201 falls under the predefined threshold, the slave system 201 sends 205 a low battery signal to the master device 203. Upon reception 205 of this low battery signal, it is determined, at the master device 203, that the Bluetooth audio link has to be switched into a power-saving mode, in which the audio packets to be sent 206 to the slave system 201 are processed via a second codec type (e.g. stereo SBC at 328 kbps).

Optionally, upon reception 205 of the low battery signal, a message may be displayed on a screen of the master device 203 for requesting a confirmation from the user that the master device 203 may be switched into the power-saving mode. In this case, the modification of the configuration of the link/links is triggered by an explicit action of the user.

Alternatively, the master device 203 may be automatically switched into the power-saving mode, without any confirmation of the user. In this case, the modification of the configuration of the link/links is triggered without any action of the user.

According to another example, while the battery level 202a of the slave system 201 is above a predefined threshold, the master device 203 may send 204 to the slave system 201 audio packets processed via a first codec type (e.g. stereo LDAC at 990 kbps). When the battery level 202b of the slave system 201 falls under the predefined threshold, it is determined, at the slave system 201, that the communication link has to be switched into a power-saving mode. The slave system 201 may then send to the master device 203 information relative to configuration parameter(s) modified based on this new operating mode. After receiving the information, the master device 203 may process audio packets with a second codec type before sending them to the slave system 201.

Of course, a similar reconfiguration method may be applied in the case where the operational parameter is the battery level of the master device 203. In such case, a low-power level of the battery of the master device 203 may be detected. Upon such detection, some configuration parameters may be modified. For instance, a data rate for the wireless link may be reduced.

FIG. 3 is a representation of a second possible embodiment of the present invention.

The slave system 201 may be configured for supporting different types of codecs (e.g. SBC, LDAC, Apt-X, etc.), wherein each codec may be associated to one or several possible bit rates (e.g. LDAC at 990 kbit/s, kbps, or 660 kbps). Alternatively, the slave system 201 may be configured for supporting one type of codec, at different possible bit rates.

In this embodiment, the operational parameter is a specific application launched on the master device 203. A change of the operational parameter is detected when the user changes the application launched on the master device 203 (for instance, the user uses Spotify© instead of Youtube©). Indeed, two applications, even if they belong to a same type of application (for instance, a streaming application) may not have the same sampling rates, and it may be advantageous to reconfigure the Bluetooth audio link so its sampling rate matches the one of the applications currently launched. Such reconfiguration avoids the audio server of the master device 203 to have to resample the audio data, which degrades the audio quality.

In this embodiment, the modification of the configuration of the link/links is implicitly triggered by an action of the user (the change of application).

Referring again to FIG. 3, the user may use a first application for which the audio packets are processed by a first codec at a first sampling rate (e.g. a stereo SBC at a sampling frequency of 48000 Hz and a bit rate of 328 kbps) and sent 301 to the audio slave system 201. When the user launches 302 a new application on the master device 203, the sampling frequency and/or the bit rate of the codec may be changed. After this change, the audio packets are processed by a second codec at a second sampling rate (e.g. a stereo SBC at a sampling frequency of 44100 Hz and a bit rate of 328 kbps).

FIG. 4 is a representation of a third possible embodiment of the present invention.

In this embodiment, the operational parameter is a type of application launched on the master device 203, for instance a gaming application (e.g. PlayerUnknown's Battlegrounds©—PUBG, Fortnite©, etc.). A change of the operational parameter is detected when the user starts a given type of application on the master device 203. Indeed, some types of application require specific operating modes: for instance, a low-latency mode may be necessary to have a better gaming experience. Therefore, if the Bluetooth slave system 201 supports such low-latency mode, it is advantageous to reconfigure the link between the master device 203 and the slave system 201 into a low latency configuration.

In this embodiment, the modification of the configuration of the link/links is implicitly triggered by an action of the user (starting a specific type of application).

Before starting the application, the Bluetooth communication link between the master device 203 and the slave system 201 may correspond to a first operating mode (e.g. a standard mode in which the latency between the source and the decoded audio may be relatively high), in which the audio packets are processed by a first codec having a first latency and sent 401 to the audio slave system 201. When the user launches 402 a specific type of application (e.g. gaming) on the master device 203, the codec may be changed to have a second latency which is much lower than the first latency. The audio packets are then processed by the new codec and sent 403 from the master device 203 to the slave system 201.

Such low latency mode may be activated in other situations, for instance, when the operational parameter is a local source of audio data, and when the change of this operational parameter corresponds to a change of application (e.g. switching from music playing to video gaming).

Alternatively or in complement, in such situations, one or several of the following configuration parameters may be modified:
the maximum number of packet retransmissions may be reduced;
the MTU may be reduced;
the maximum Flush Timeout parameter may be reduced.

Of course, more than one configuration parameters may be modified. For instance, it is possible to modify both the MTU and the sampling rate.

Figure 5:
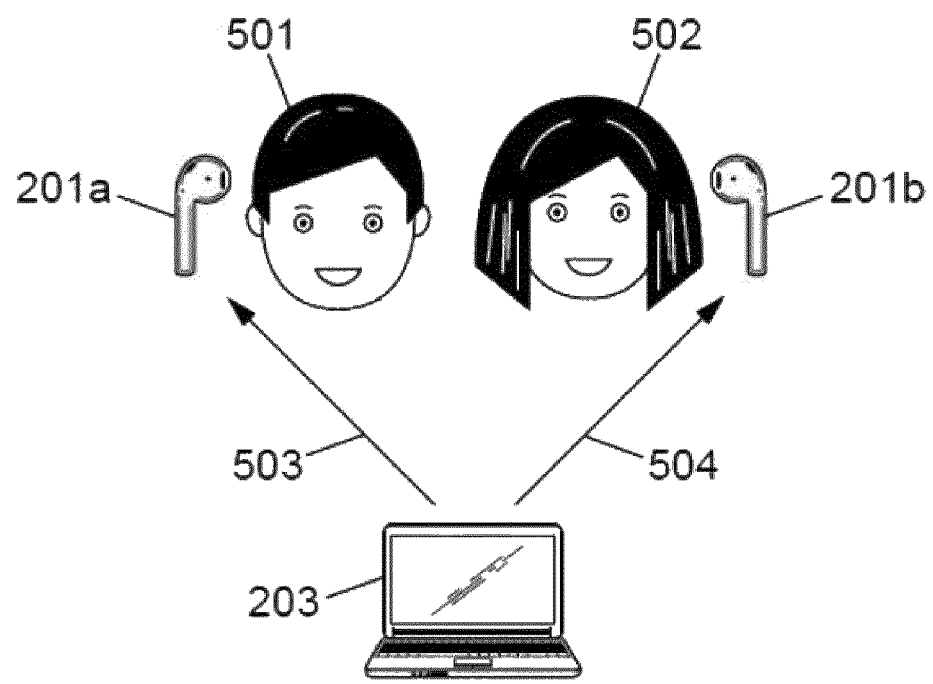
FIG. 5 is a representation of a fourth possible embodiment of the present invention.

FIG. 5 is a representation of a fourth possible embodiment of the present invention.

In this embodiment, the slave system 201 may consist of a pair of earbuds 201a, 201b.

By default, each earpiece may be configured for outputting respective audio data. For instance, for a stereo audio content, the first earbud 201a may be configured to play audio data relative to one of the two channels (for instance, the right channel), and the second earbud 201b may be configured to play audio data relative to the other one of the two channels (for instance, the left channel).

When two users 501, 502 want to share an audio content with another user 502, each user 501, 502 may use a respective earbud 201a, 201b among the pair of earbuds connected to a master device 203. However, in the default configuration described above, there is a lack of auditory comfort for the users 501, 502, since each user 501, 502 only receives audio content corresponding to one of the two channels.

Therefore, it may be interesting to activate a "sharing mode", in which the audio data sent 503, 504 to each earbud 201a, 201b incorporate stereo data.

For example, in the default configuration, the transmission of audio packets may be performed based on a first codec (e.g. an SBC codec), the right earbud 201a being configured for playing audio data corresponding to the right channel and the left earbud 201b being configured for playing audio data corresponding to the left channel. For instance, the first codec may be a stereo codec in case of a forwarding architecture, or a mono codec in a point-to-multipoint architecture.

In the sharing mode, the transmission of audio packets may be performed based on a second codec (e.g. an SBC codec), wherein each packet includes data corresponding to both of the left and the right channel and is sent 503, 504 to both earbuds 201a and 201b. Therefore, both earbuds 201a and 201b are configured to play a same audio content based on the received packets. The second codec may be a mono codec, or a stereo codec with a same audio content on the two channels. An audio content may correspond for instance to a downmixed channel of a left channel and a corresponding right channel.

In a possible embodiment, the user may select the "sharing mode" on the master device 203 or on the slave system 201. In this case, the modification of the configuration of the link/links is explicitly triggered by an action of the user.

Alternatively, the sharing mode may be automatically activated, for instance, when it is detected that the distance between the two earbuds 201a, 201b is above a predefined threshold.

Figure 6:
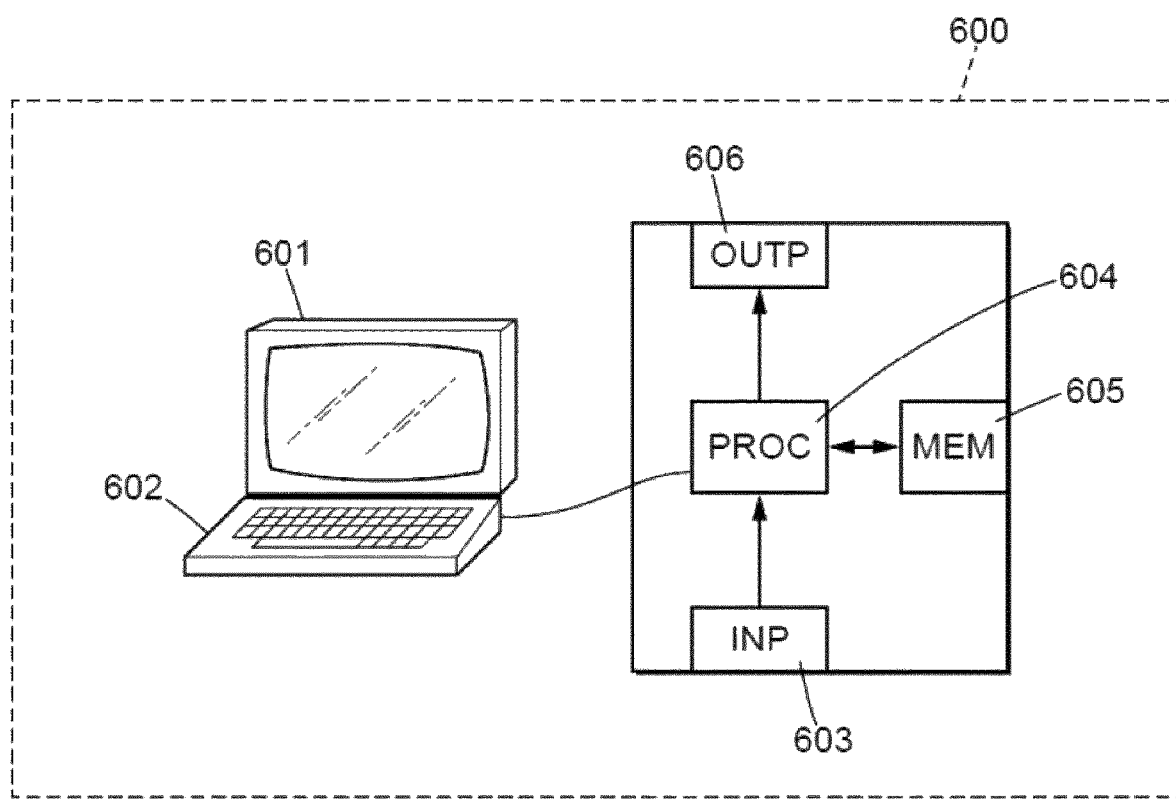
FIG. 6 is a possible embodiment for a device that enables the present invention.

FIG. 6 is a possible embodiment for a device that enables the present invention. Such device may be incorporated into the master device or into the slave device.

In this embodiment, the device 600 comprises a computer, this computer comprising a memory 605 to store program instructions loadable into a circuit and adapted to cause circuit 604 to carry out the steps of the present invention when the program instructions are run by the circuit 604.

The memory 605 may also store data and useful information for carrying the steps of the present invention as described above.

The circuit 604 may be for instance:
a processor or a processing unit adapted to interpret instructions in a computer language, the processor or the processing unit may comprise, may be associated with or be attached to a memory comprising the instructions, or
the association of a processor/processing unit and a memory, the processor or the processing unit adapted to interpret instructions in a computer language, the memory comprising said instructions, or
an electronic card wherein the steps of the invention are described within silicon, or
a programmable electronic chip such as a FPGA chip (for «Field-Programmable Gate Array»).

This computer may comprise an input interface 603 for receiving information relative to a change of value of an operational parameter in either the Bluetooth device or the second device according to the invention, and an output interface 606 for providing a configuration parameter of the Bluetooth communication link based on a new operating mode.

To ease the interaction with the computer, a screen 601 and a keyboard 602 may be provided and connected to the computer circuit 604.

Furthermore, the block diagram represented in FIG. 1 is a typical example of a program which some instructions can be performed by the device described 600. FIG. 1 may thus correspond to the flowchart of the general algorithm of a computer program within the meaning of the invention.

In one embodiment of the invention the Bluetooth operation is conducted by a Bluetooth driver stored in a first section of the memory 605, while the operational parameters are determined with an operating system stored in a second section of memory 605. Additionally, the operating system may interface with one or more applications to determine one or more operational parameters, where the application is located in a third section of memory 605. This advantageously separation of these functions allows for independent development of each without the need to alter the other functions at the same time.

Of course, the present invention is not limited to the embodiments described above as examples. It extends to other variants and other situations than those presented above.

For example, when the change of an operational parameter corresponds to a change in an audio source application from a conferencing application to a streaming application, the modification of a configuration parameter may comprise changing a sound quality configuration parameter of an audio codec to a higher quality, wherein the audio codec processes information associated with the streaming application.

The sound quality configuration parameter may be for instance a sampling rate for an audio codec, an audio codec selection parameter, or a configuration parameter changing the channel configuration from mono to stereo.

According to another example, when the change of an operational parameter corresponds to a change in an audio source application from a streaming application to a conferencing application, the modification of a configuration parameter may comprise changing a channel configuration parameter from a unidirectional audio link to a bidirectional audio link.

When the slave system 201 consists in two earbuds 201a, 201b, it can happen that one of the two earbuds is disabled (e.g. if the communication link is interrupted to this earbud). In such a situation, it may be detected that one earbud is deactivated, and the channel configuration may be switched from stereo to mono. The deactivation of one earbud may be performed, for instance, by receiving a message on the master device.

A similar change may be performed when a change in the local source of audio data from a stereo source to a mono source is detected. The wireless communication link may be reconfigured from a stereo link to a mono link in response to said change, and the audio data are then transmitted to the earbuds in mono format.

Depending on the embodiment chosen, certain acts, actions, events or functions of each of the methods described herein may be performed or occur in a different order from that in which they were described, or may be added, merged or not to be performed or not to occur, as the case may be. In addition, in some embodiments, certain acts, actions or events are performed or occur concurrently and not successively.

Although described through a number of detailed exemplary embodiments, the proposed method and equipment for implementing the method include various alternatives, modifications and improvements which will be apparent to those skilled in the art, it being understood that these various variants, modifications and improvements fall within the scope of the invention, as defined by the following claims. In addition, various aspects and features described above may be implemented together, or separately, or substituted for each other, and all of the various combinations and sub-combinations of aspects and features are within the scope of the invention. In addition, some of the systems and equipment described above may not incorporate all of the modules and features described for the preferred embodiments.

The present disclosure also relates to the field of audio streaming. Specifically, the following relates to methods and devices for transmitting an audio data stream using a Bluetooth communication link.

In the background art, Bluetooth defines a communication standard for transmitting and receiving audio data wirelessly over distances which are typically limited up to 10 meters and using radio waves with a frequency comprised in the Ultra High Frequency band. This standard makes Bluetooth devices very popular among customers due to their portability, and in particular, for short-range applications.

The audio quality of the transmitted and received data depends mainly on digital audio encoders and decoders, called codecs, which are used to transfer data to Bluetooth audio output devices like headphones or loudspeakers. The use of standard Bluetooth codecs, namely, the low-complexity subband codec called SBC, is necessary as it is designed to provide a reasonably good audio quality at medium bit rates while keeping low computational complexity. Further, SBC supports mono and stereo streams with sampling frequencies up to 48 kHz while bitrates are usually being set up to 193 kbits and 328 kbits for mono and joint-stereo streams, respectively.

In view of improving the quality of transmitted and received audio data, a current trend is to propose codecs requiring increasingly large bandwidth usage, such as the APTX audio codec compression algorithm or the LDAC audio hybrid coding technology, which allows streaming audio over Bluetooth connections with bitrates up to 352 and 990 kbit/s, respectively.

Because of the need for lossy compression due to limited bandwidth, such codecs are being developed so as to limit the audio quality loss when using standard Bluetooth protocols and codecs, such as SBC.

However, the quality of an audio stream is not necessarily improved by using codecs which have a higher bandwidth usage, since achieving such a quality depends on the different coding, decoding, mixing and sampling processes which are used by audio devices for transmitting audio streams. This is true, in particular, for source devices such as smartphones and sink devices such as wireless headphones or speakers, when using the Bluetooth standard.

Moreover, the streaming applications used by the current audio listening devices rely on their own encoding format, which has a higher compression rate and better algorithms than the standard Bluetooth codecs such as SBC. This also implies that audio data being streamed between a source and a sink device suffers multiple decoding, encoding and resampling processes, resulting in possibly significant quality loss.

Further objects of the disclosure are now described.

A first object of the following is to provide methods and devices for improving the quality and the latency of an audio stream, and specifically, of an audio stream transmitted by Bluetooth.

To address at least some of the aforementioned issues, a first object of the following relates to a method for transmitting an audio stream over a Bluetooth communication link, the method being carried out by a source device and comprising:

receiving an audio codec configuration and a sampling rate of the audio stream, said audio stream coming from a streaming application running on the source device;

configuring a Bluetooth audio stream between the source device and a sink device using the received audio codec configuration and sampling rate;

receiving the first audio stream from the streaming application;

packetizing the received first audio stream into said Bluetooth audio stream; and transmitting the Bluetooth audio stream to the sink device over the Bluetooth communication link, the transmitted Bluetooth audio stream comprising the packetized received audio stream.

Herein, Bluetooth refers to any version of the Bluetooth protocol, including existing and future versions. Currently, version 5.1 of Bluetooth comprises Basic Rate/Enhanced Data Rate protocol, also called BR/EDR protocol or Bluetooth classic protocol, and Bluetooth Low Energy protocol, also called BLE protocol.

Herein, a communication link designates a wireless communication between two devices. Further, a Bluetooth communication link is configured to include a plurality of Bluetooth physical links, for instance between a given source device and a given sink device, such as a smartphone. A Bluetooth communication link may comprise different types of links, such as a point-to-point connection or a one-way link.

Herein, packetizing designates transforming audio data into multiple audio data packets. Such audio data packets correspond to a given number of bytes.

Herein, a codec is a hardware or a software component configured for encoding and/or decoding digital data stream or a signal.

Herein, an audio codec configuration is a configuration which includes information such as a type of codec, a bitrate, i.e. a rate at which bits can be transferred from one location to another, and a corresponding integer size such as 16 bits or 24 bits. Types of codec comprise SBC, AAC, MP3, APT-X, LDAC, LHDC, Vorbis, Opus or LC3 codecs.

Herein, the streaming application is preferably an audio application or a gaming application which is configured to stream audio and/or video data.

The method according to the first object allows transmitting an audio stream over a Bluetooth communication link with reduced quality loss and lower latency. Indeed, the methods of the background art generally require source device and/or sink devices to perform an encoding, a decoding, and resampling or a mixing of the audio stream, which systematically results in a quality loss or in an increase of the latency.

Herein, an audio application can be any application providing a digital music, an access to an audio content or a podcast streaming service, such as a cloud-based streaming service or in general.

This allows providing a Bluetooth audio streaming passthrough. Namely, when the streaming application comprises a gaming application, this allows transmitting and streaming corresponding audio data over a Bluetooth communication link with a low latency, since streaming directly from the gaming application and bypassing the audio server to improve the latency.

Herein, an audio codec configuration can be empty. Typically, an empty audio codec configuration refers to non-encoded audio data, such as a pulse-code modulation, called PCM, or an analog audio signal which corresponds to a PCM audio codec configuration.

In an embodiment, the Bluetooth communication link is pre-established, that is, a Bluetooth communication link which is established between the source device and the sink device during a preliminary step which precedes the transmitting of the Bluetooth audio stream to the sink device.

In a preferred embodiment, the receiving of the audio stream from the streaming application is carried out upon receipt of an unmodified bitstream from the streaming application.

Herein, a bitstream is a sequence of bits. Packets resulting from a packetizing of audio data can be grouped, encoded or decoded into contiguous pages of structured bitstream data, said contiguous pages being called logical bitstreams.

Herein, several logical bitstreams can be combined into a single physical bitstream. If a physical bitstream comprises more than one logical bitstream, such logical bitstreams are said to be "wrapped" in the physical bitstream. Unwrapping said logical bitstreams from the physical bitstream can be performed by decoding, although a complete decoding is not necessarily required for extracting multiple logical bitstreams.

Herein, an unmodified bitstream is a bitstream that is transmitted as such and is not resampled, for instance by an audio server located between the audio application and the Bluetooth stack of the source device.

In a preferred embodiment, the method further comprises:

receiving at least one other audio stream, called second audio stream, from an audio server; and transmitting said received second audio stream to the sink device over the Bluetooth communication link.

Herein, an audio server is any platform configured to manage and/or share audio resources or audio flows with other systems, said systems comprising, in particular, the source device and the sink device. For instance, said audio resources or audio flows comprise music from an audio application, sound notifications from a social media, sound from a clock alarm from a scheduling application, etc.

Herein, an audio server can comprise an audio hardware interface, an operating system, a computer, an electronic circuit or any kind of computer-readable medium on which audio data can be stored or that can receive and send a stream of audio data. Said audio server can be connected to a network like the Internet.

This provides a hybrid streaming method with two audio streams, said two audio streams being encapsulated in a single Bluetooth audio stream.

This allows the method of the first object to generate an alternate path for transmitting and streaming audio data, said path bypassing possible audio server that are required in methods of the background art. Therefore, this allows avoiding performing coding, decoding, mixing or resampling implying quality loss on a receiving end of the Bluetooth communication link.

This also allows transmitting the audio streams with reduced quality loss and lower latency compared to known methods involving receiving and transmitting an audio stream from an audio server, since said methods require such an audio stream to be mixed with the audio stream coming from the streaming application, resulting in quality loss. Moreover, these methods also require the audio server to perform a mixing or a resampling of the audio streams using the sampling rate of the audio server or of the sink device, which results in a loss of quality and may also increase the latency.

In a preferred embodiment, the Bluetooth audio stream is of a multi-contribution type, the method further comprising packetizing the received second audio stream into the Bluetooth audio stream using an audio codec configuration and a sampling rate of the second audio stream.

This provides a hybrid streaming method with two audio streams, said two audio streams being encapsulated in two Bluetooth audio streams on a single Bluetooth communication link.

Herein, a Bluetooth audio stream being of a multi-contribution type implies that the audio codec configuration (or the sampling rate) is used in a non-exclusive way. In other words, the audio codec configurations (or the sampling rates) of both the first audio stream and the second audio stream are used to configure the Bluetooth audio stream, which then corresponds to a multi-contribution type Bluetooth audio stream.

In a preferred embodiment, the method further comprises:
receiving, by the sink device, a plurality of Bluetooth audio streams transmitted by the source device;
mixing the plurality of Bluetooth audio streams into a mixed audio stream; and
rendering the mixed audio stream in the sink device.

This allows improving the quality and/or the latency of multiple audio streams on the receiving end of the Bluetooth communication link In a preferred embodiment, the method further comprises wrapping the audio stream received from the streaming application and/or the received second audio stream into a container, said container being placed into the Bluetooth audio stream.

This allows encapsulating multiple audio streams in a single container, so that it is possible to transmit said streams in a same packet even if they correspond to different audio codec configurations and/or sampling rates. In other words, this provides a hybrid streaming method with two audio streams, said two audio streams being encapsulated in a single container which is sent from the source device in a single container.

In embodiments, the streaming application and the audio server use different codecs, and therefore, different audio codec configurations and different sampling rates. For instance, the application may use a high-quality codec for audio streaming and the audio server may use a low-quality codec for notifications.

For instance, an Ogg stream can be used to encapsulate one or several logical bitstreams created by one or several encoders of an audio server. Once encoded, an audio server logical bitstream can be wrapped into the container with the application logical bitstream, both logical bitstreams being transmitted to the sink device using a same packet. The sink device can then unwrap the two logical bitstreams, decode them separately using their respective codecs and mix them into a single raw stream to be output.

Herein, a container is an entity defining a media payload format. An audio container, which defines an audio payload format, can be associated with one or multiple codecs. For instance, a LATM container can be associated with a AAC codec, an Ogg container can be associated with a Vorbis or an Opus container.

In a preferred embodiment, the container is an Ogg-Vorbis container.

In a preferred embodiment, the audio stream received from the streaming application, called first audio stream, and the second audio stream are wrapped into the container, the packetizing of said first and second audio streams into the Bluetooth audio stream being carried out using the first and second wrapped audio streams.

In a preferred embodiment, the first audio stream or the second audio stream is a Vorbis encoded stream, or the first audio stream and the second audio streams are Vorbis encoded streams.

In an embodiment, at least two Bluetooth logical links are used for transmitting audio streams.

This provides a hybrid streaming method for transmitting at least two audio streams. In particular, two audio streams are encapsulated in two Bluetooth audio streams, to be transmitted over the Bluetooth communication link.

This allows transmitting audio stream with a higher flexibility, since at least two Bluetooth logical links can be used. Even if there is already an established Bluetooth audio stream bypassing the audio server on a first Bluetooth logical link, a second Bluetooth audio stream can be used on a second Bluetooth logical link, e.g. for collecting notifications arising from another application running on the source device. Thus, this allows two Bluetooth audio streams to be transmitted on a same logical channel, or on two different logical channels.

For instance, if the streaming application is gaming application, said gaming application can stream audio data directly towards a Bluetooth stack that the source device comprises. However, there is more flexibility in using at least two Bluetooth audio streams on two different Bluetooth logical links, since at least one Bluetooth audio stream can be used to render high quality audio from the gaming application, and at least another Bluetooth audio stream can be used to render sound from another source, such as sound notifications from a social media application running on the source device or coming from the audio server. The two logical links are either using the same Bluetooth physical link or two different ones.

In a preferred embodiment, the method further comprises:
packetizing the received second audio stream into another Bluetooth audio stream, called second Bluetooth audio stream, said second Bluetooth audio stream being distinct from the Bluetooth audio stream configured between the source device and the sink device, called first Bluetooth audio stream, and
transmitting said second Bluetooth audio stream to the sink device over the Bluetooth communication link, the second Bluetooth audio stream being multiplexed with said first Bluetooth audio stream.

Herein, multiplexing is carried out using one or more protocols, such as an AVDTP protocol or any other protocol adapted for transmitting an audio stream over a Bluetooth communication link.

In a preferred embodiment, the first Bluetooth audio stream or the second Bluetooth audio stream is transmitted over a BR/EDR link of the Bluetooth communication link, or the first Bluetooth audio stream and the second Bluetooth audio streams are transmitted over a BR/EDR link of the Bluetooth communication link.

In a preferred embodiment, the second Bluetooth audio stream is transmitted over a BLE link of the Bluetooth communication link.

In a preferred embodiment, the transmitting of the Bluetooth audio stream is performed upon a successful negotiation, with the sink device, of the audio codec configuration and of the sampling rate.

This allows ensuring that the sink device supports both the audio codec configuration and the sampling rate. This also allows the streaming application checking itself whether the sink device can support or not the native codec and the native sampling rate of the streaming application.

According to a second object, the following relates to a method for receiving a Bluetooth audio stream over a Bluetooth communication link, the method being carried out by a sink device, wherein the method comprises:

receiving, a plurality of Bluetooth audio streams transmitted by a source device over the Bluetooth communication link;

mixing the plurality of received Bluetooth audio streams into a mixed audio stream; and rendering the mixed audio stream.

In an embodiment of the method of the second object, at least one first Bluetooth audio stream among said received plurality of Bluetooth audio streams comprises a packetized audio stream, the packetizing of said audio stream into the first Bluetooth audio stream being performed by the source device, the first Bluetooth audio stream being configured between the source device and the sink device by the source device using an audio codec configuration and a sampling rate of a first audio stream, said audio codec configuration and said sampling rate being received by the source device, said first audio stream coming from a streaming application running on the source device.

In an embodiment of the method of the second object, the transmitting of the first Bluetooth audio stream is performed by the source device upon a successful negotiation, with the sink device, of the audio codec configuration and of the sampling rate.

In an embodiment, the method of the second object further comprises:

receiving, from the source device, at least a second audio stream over the Bluetooth communication link, said second audio stream being received by the source device from an audio server, said second audio stream being different from the first audio stream.

In an embodiment, the method of the second object further comprises:

receiving, from the source device, a second Bluetooth audio stream device over the Bluetooth communication link, the second Bluetooth audio stream being multiplexed with the first Bluetooth audio stream, the received second audio stream being packetized by the source device into the second Bluetooth audio stream, said second Bluetooth audio stream being distinct from the first Bluetooth audio stream.

According to a third object, the following relates to a computer program product comprising a computer readable medium having stored thereon computer program instructions loadable into a computing device and adapted to—when loaded into and executed by said computing device—cause the computed device to perform the steps of a method according to anyone of the previous claims.

According to a fourth object, the following relates to a source device for transmitting an audio stream over a Bluetooth communication link, said source device being configured to:

receive an audio codec configuration and a sampling rate of the audio stream of a streaming application running on the source device;

configure a Bluetooth audio stream between the source device and a sink device, using the received audio codec configuration and sampling rate;

receive the audio stream from the streaming application;

packetize the received audio stream into said Bluetooth audio stream; and transmit the Bluetooth audio stream to the sink device, the Bluetooth audio stream comprising the packetized received audio stream.

According to a fifth object, the following relates to a sink device for receiving a Bluetooth audio stream over a Bluetooth communication link, said sink device being configured to:

receive a plurality of Bluetooth audio streams transmitted by a source device over the Bluetooth communication link;

mix the plurality of Bluetooth audio streams into a mixed audio stream; and render the mixed audio stream in the sink device.

In an embodiment of the sink device of the fifth object, at least one Bluetooth audio stream among said received plurality of Bluetooth audio streams comprising a packetized audio stream, the packetizing of said audio stream into said at least one Bluetooth audio stream being performed by the source device, the at least one Bluetooth audio stream being configured between the source device and the sink device by the source device using an audio codec configuration and a sampling rate of a first audio stream, said audio codec configuration and said sampling rate being received by the source device, said first audio stream coming from a streaming application running on the source device.

According to a sixth object, the following relates to a system for transmitting and receiving a Bluetooth audio stream over a Bluetooth communication link, said system comprising a source device according to the fourth object and a sink device according to the fifth object.

A brief description of further drawings is now described.

Other features, details and advantages of the objects of the disclosure will be apparent from the following detailed description given by way of non-limiting example, with reference to the accompanying drawings, as described hereafter.

Figure 7:
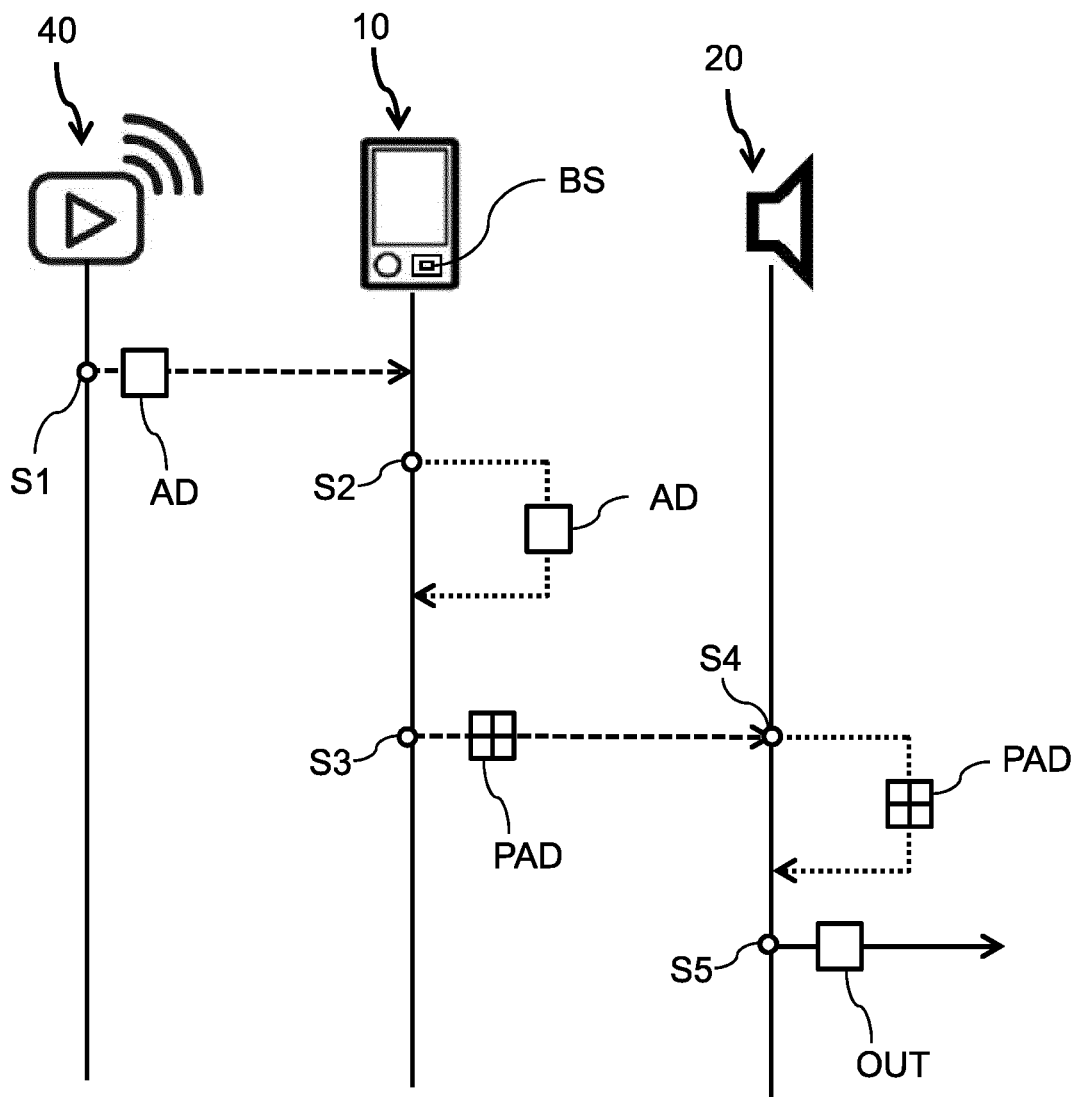
Figure 8:
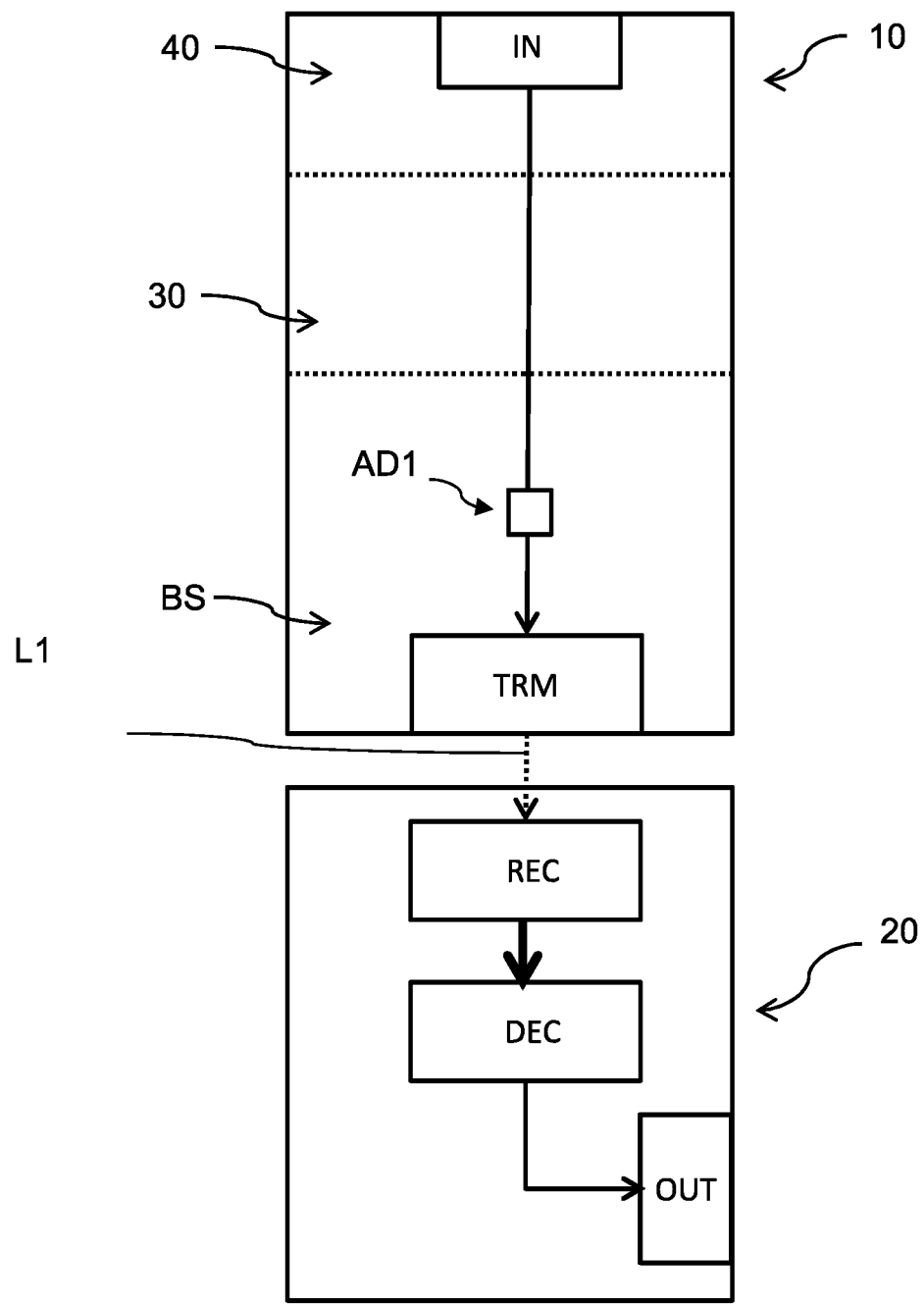
Figure 9:
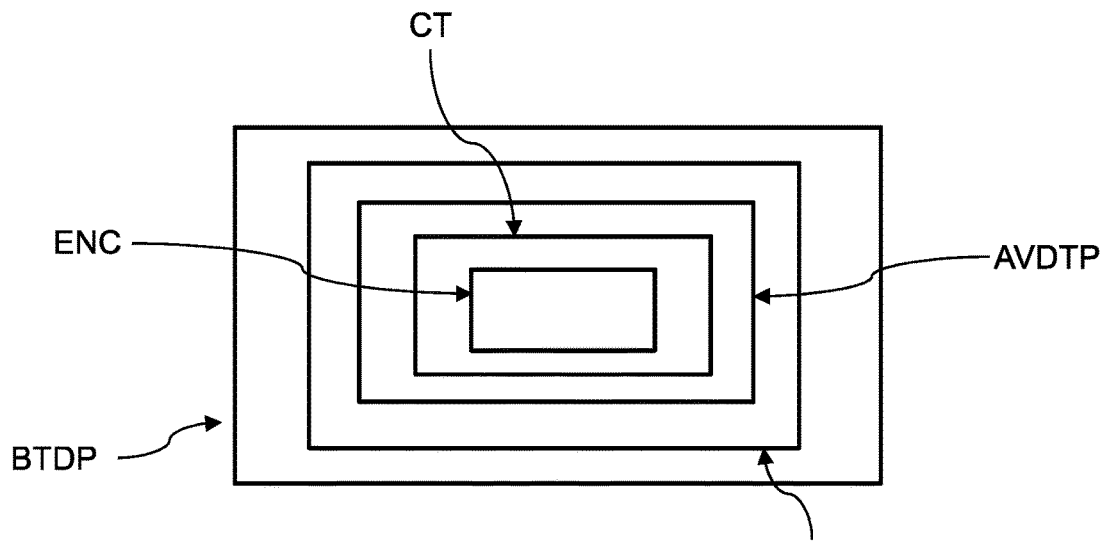
Figure 10:
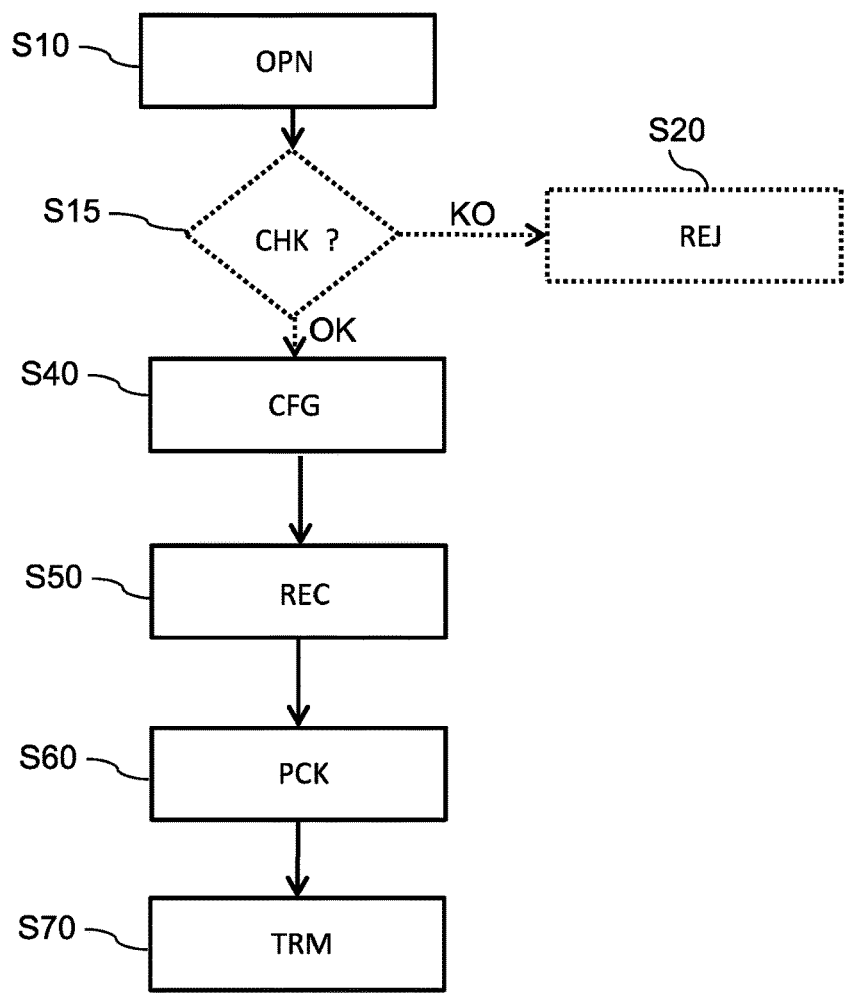
Figure 11:
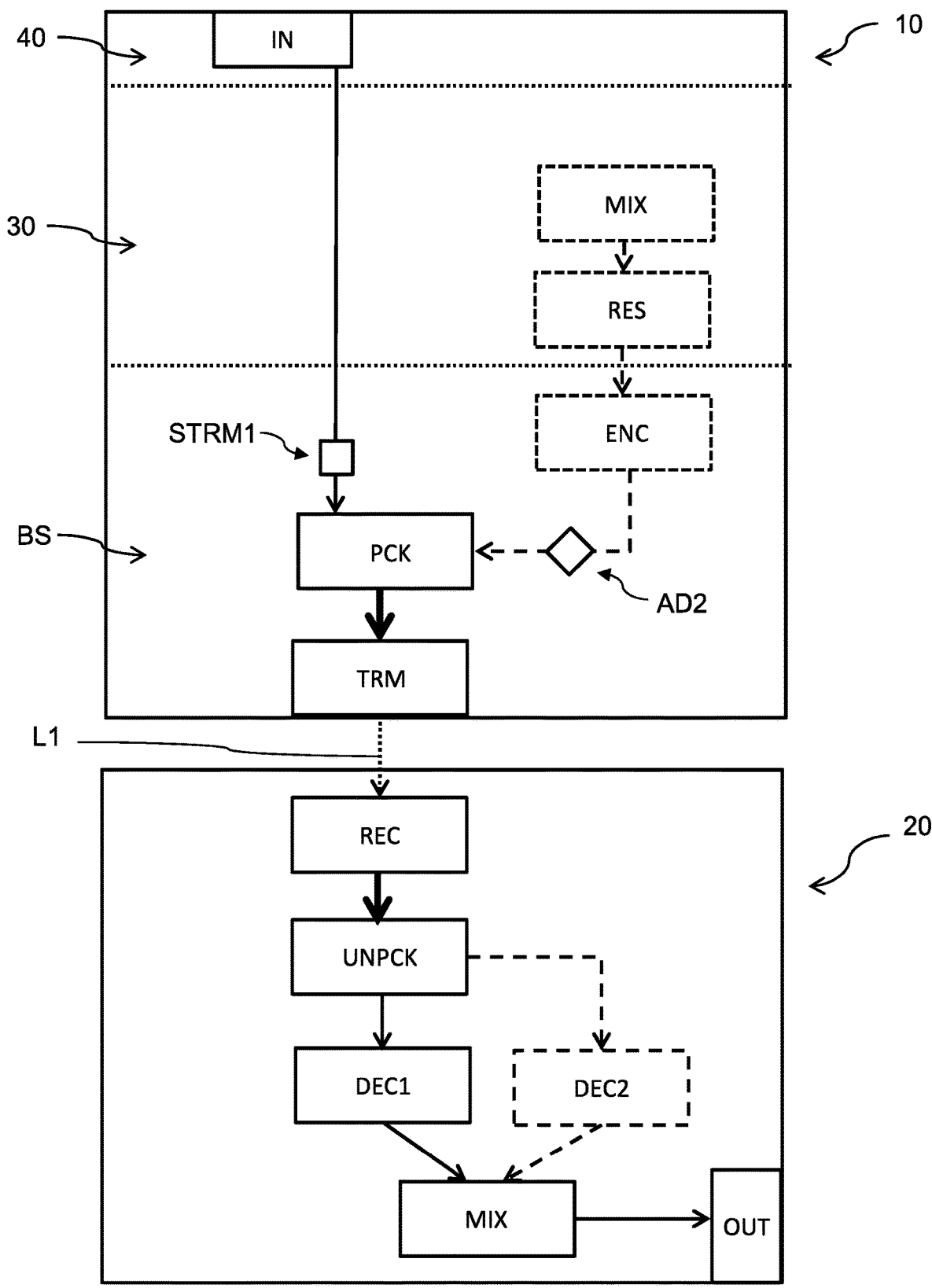
Figure 12:
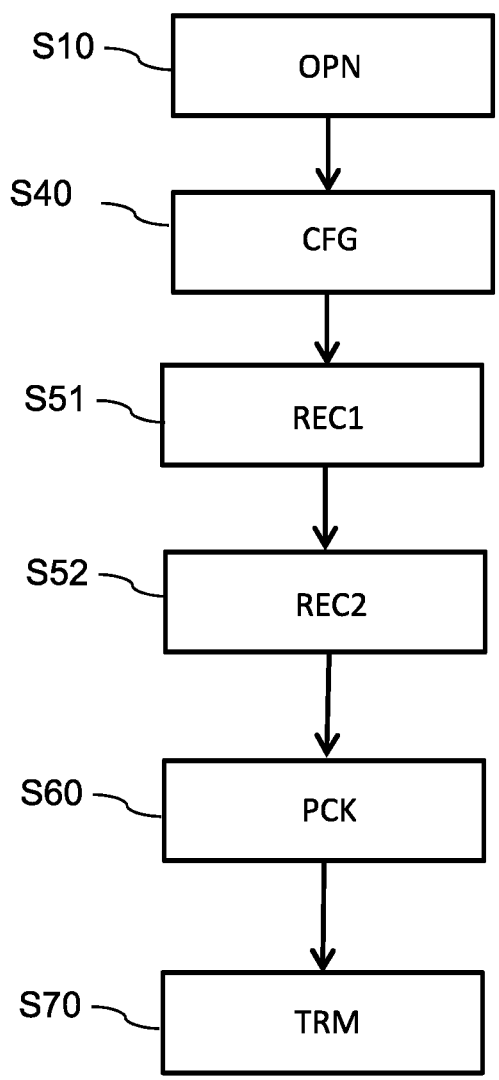
Figure 13:
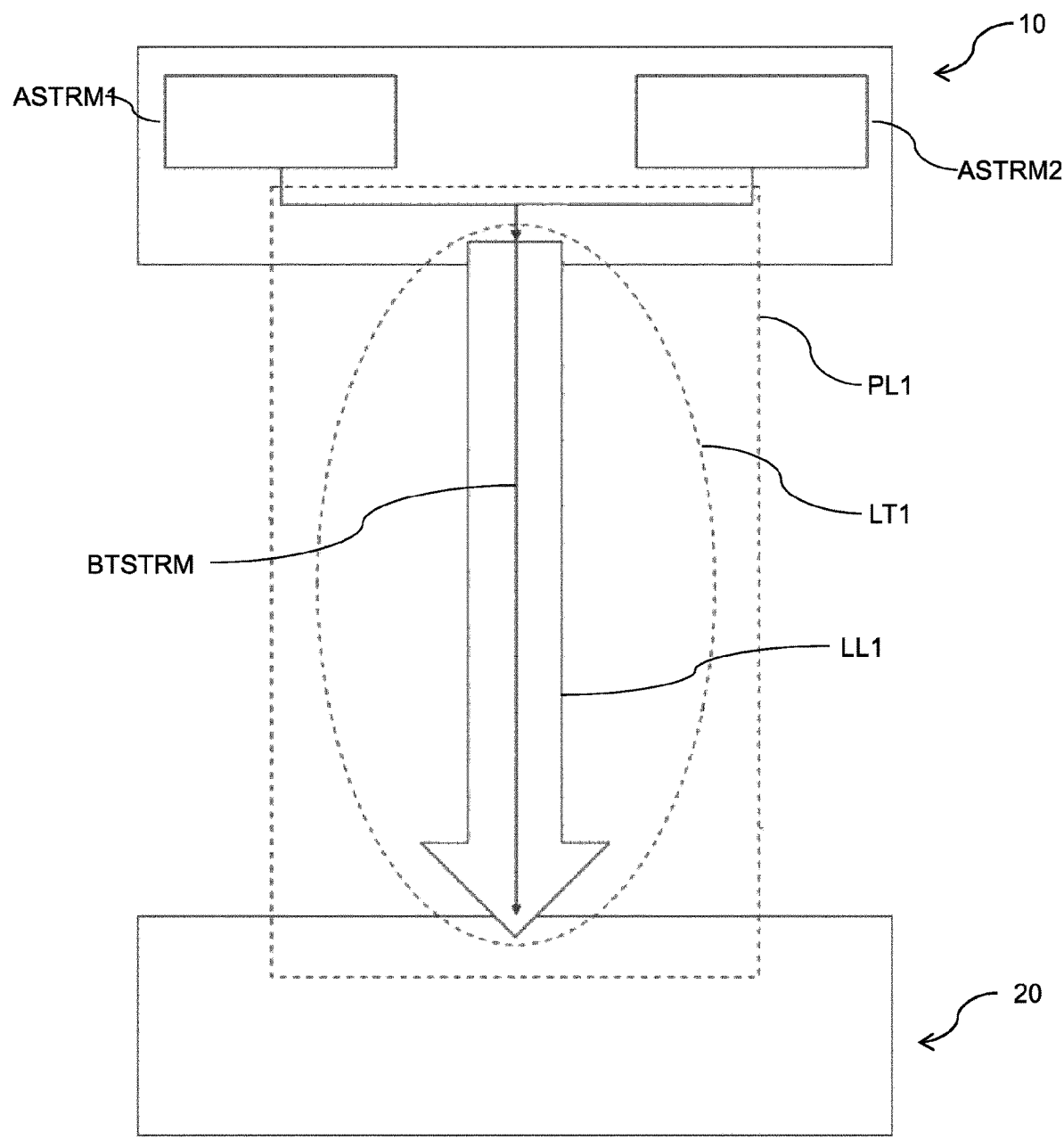
Figure 14:
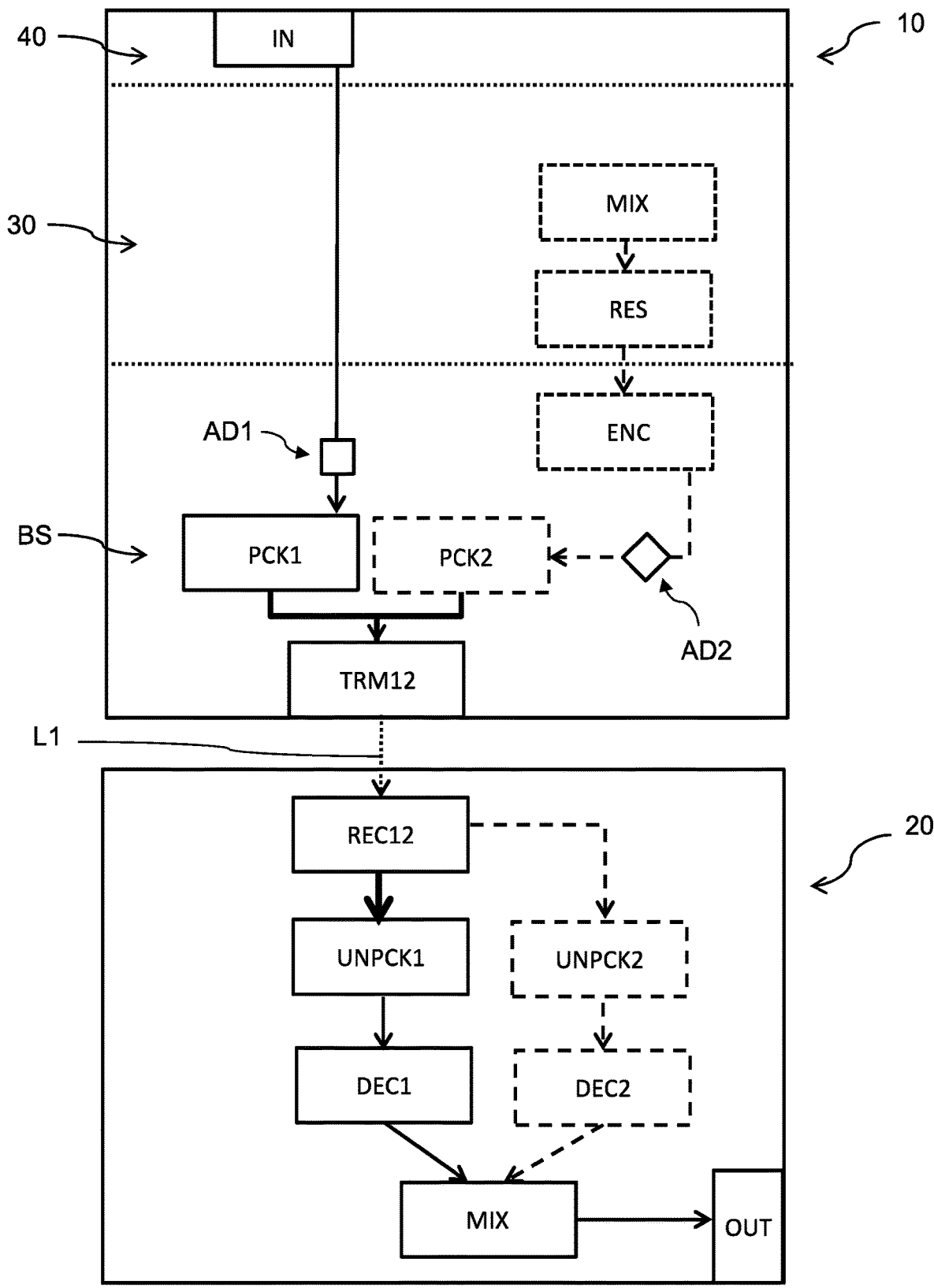
Figure 15:
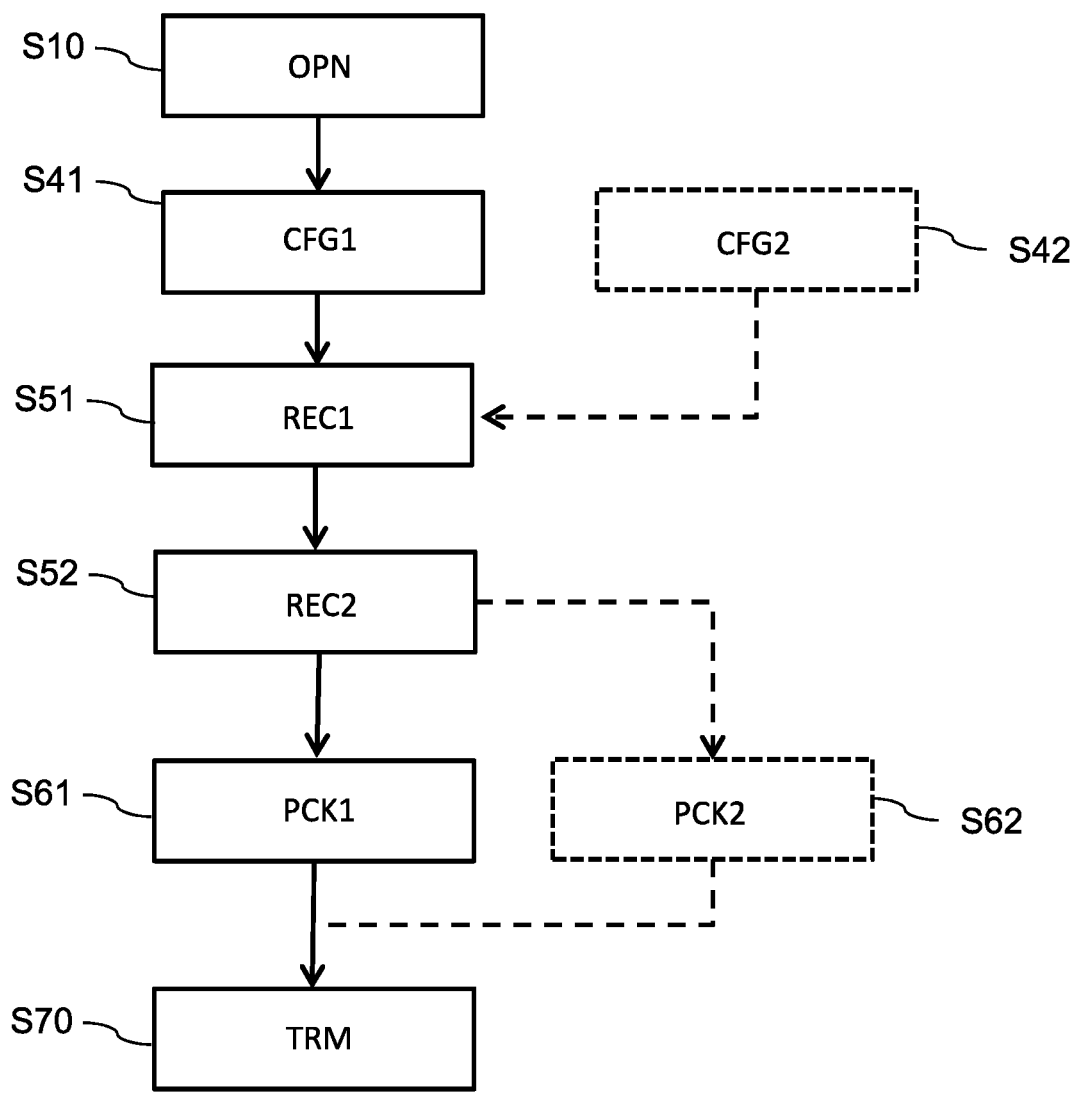
Figure 16:
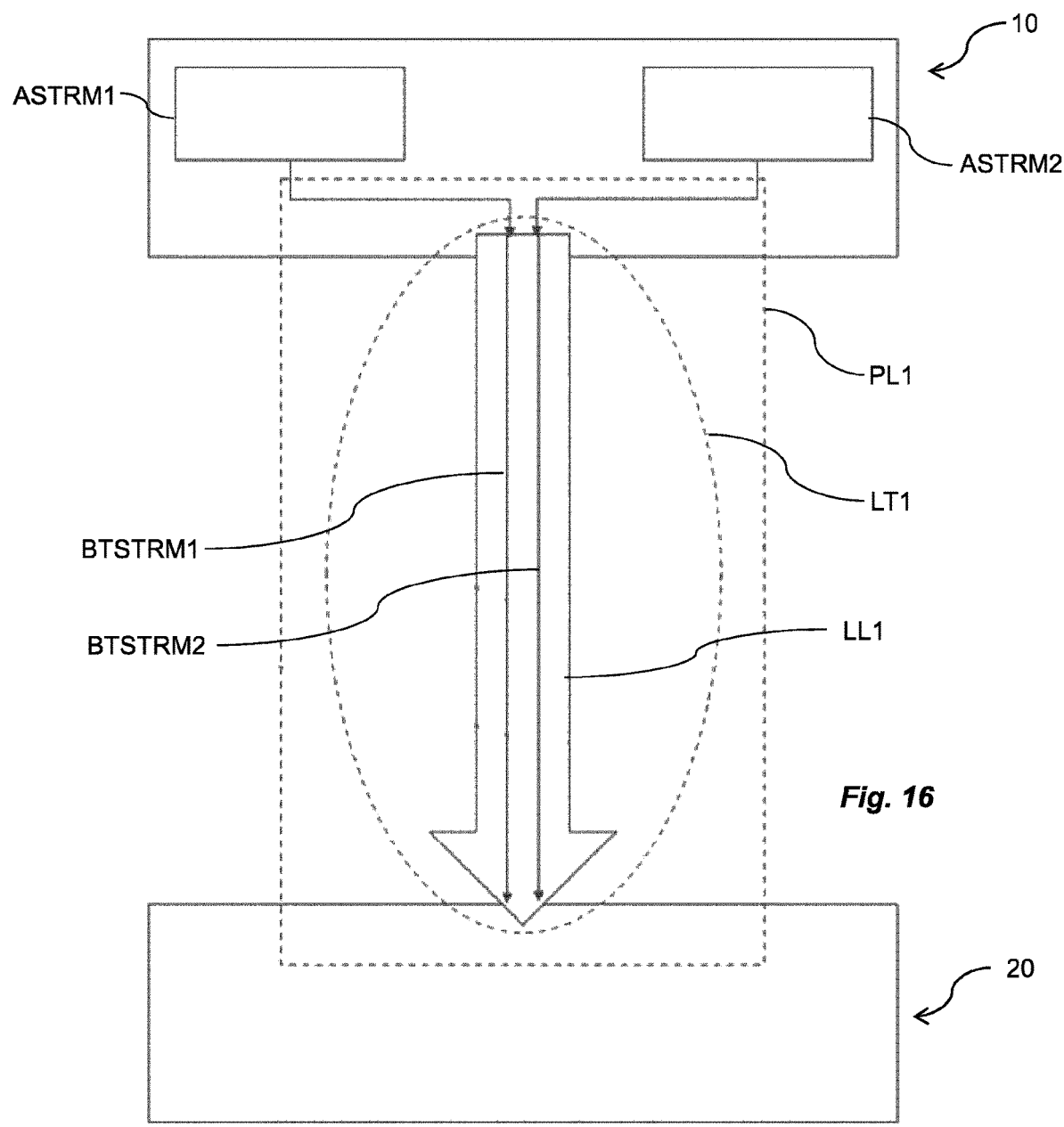
Figure 17:
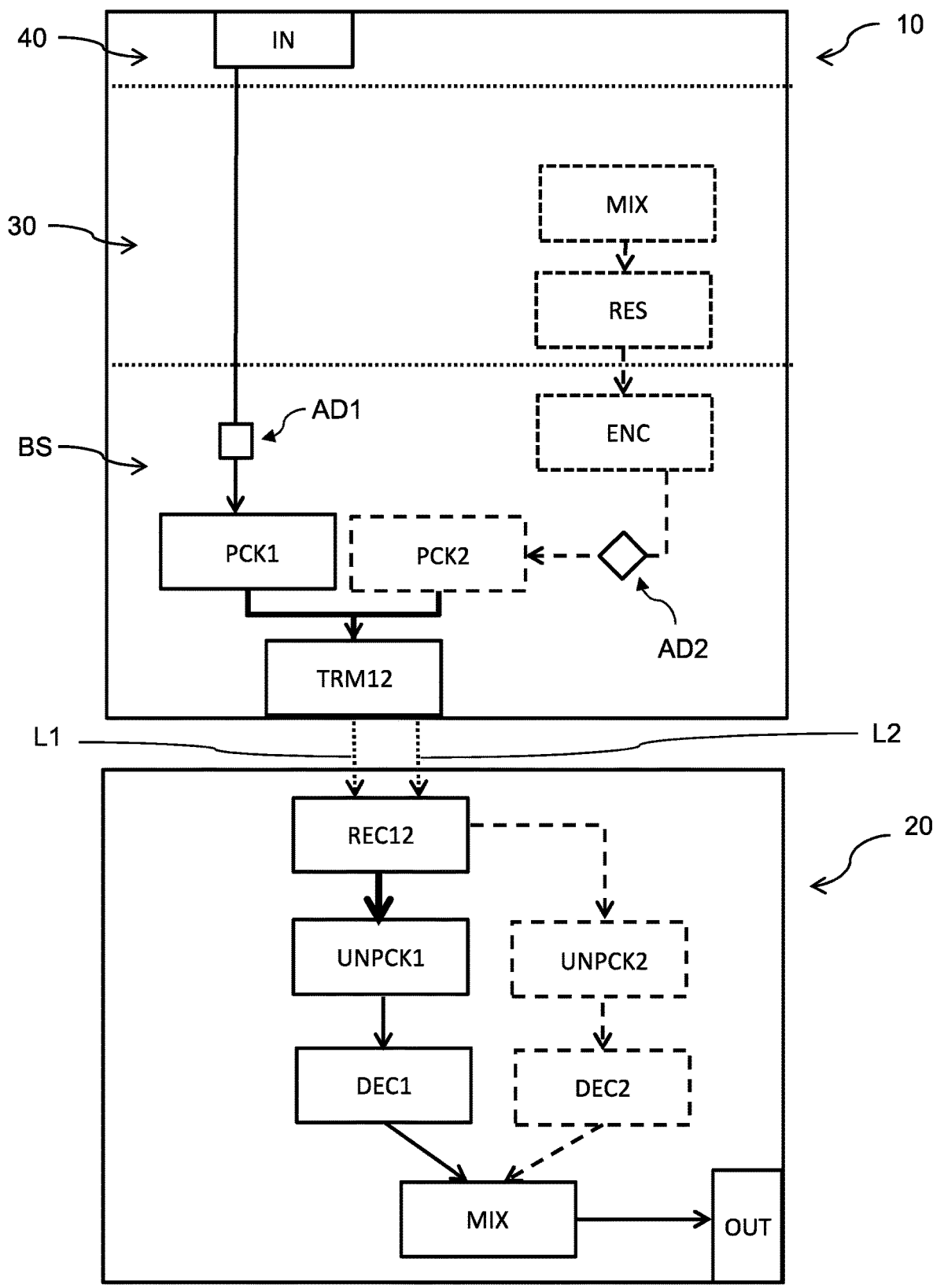
Figure 18:
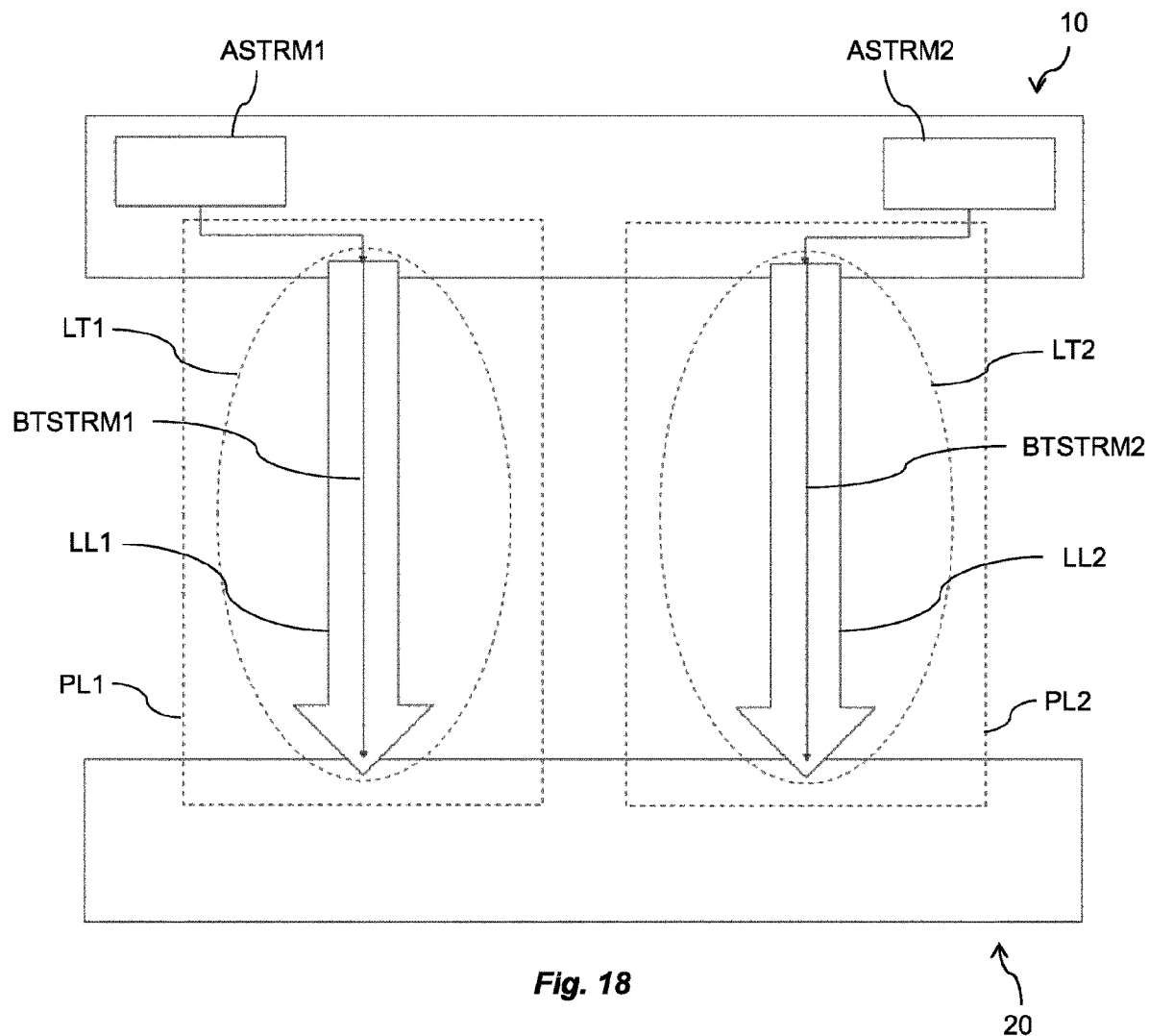
Figure 19:
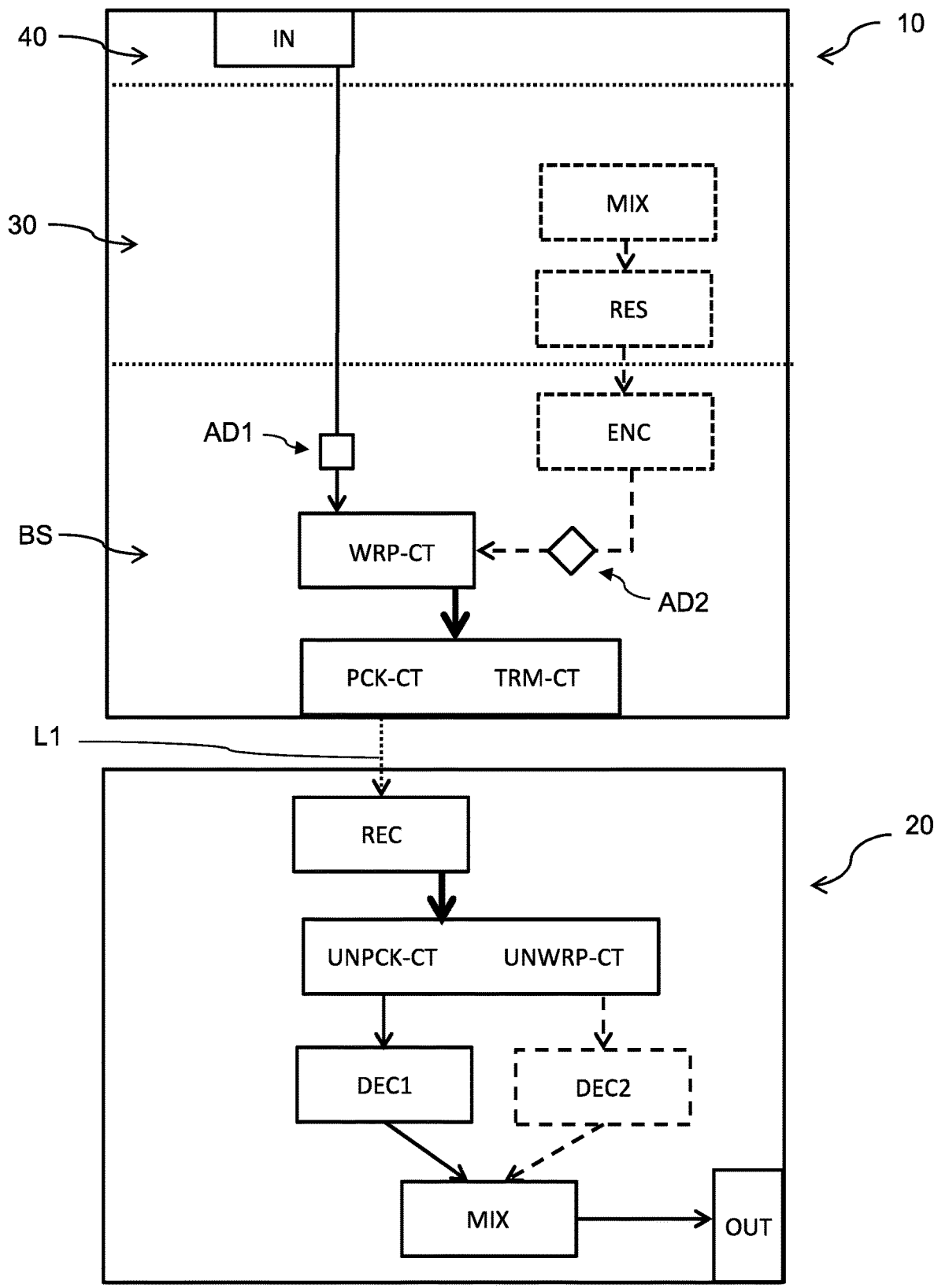
Figure 20:
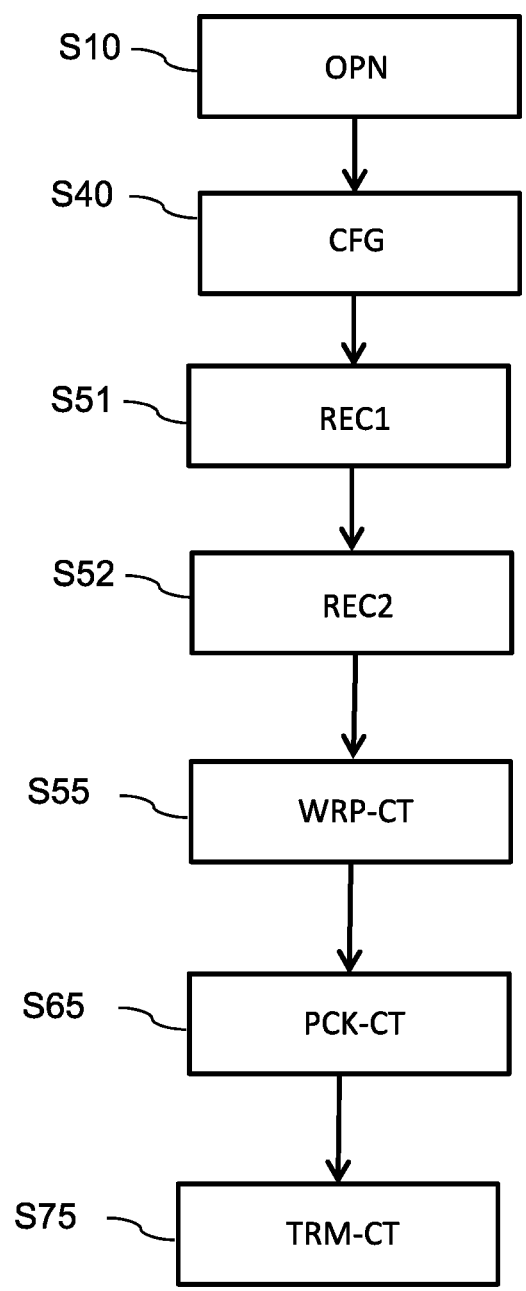
Figure 21:
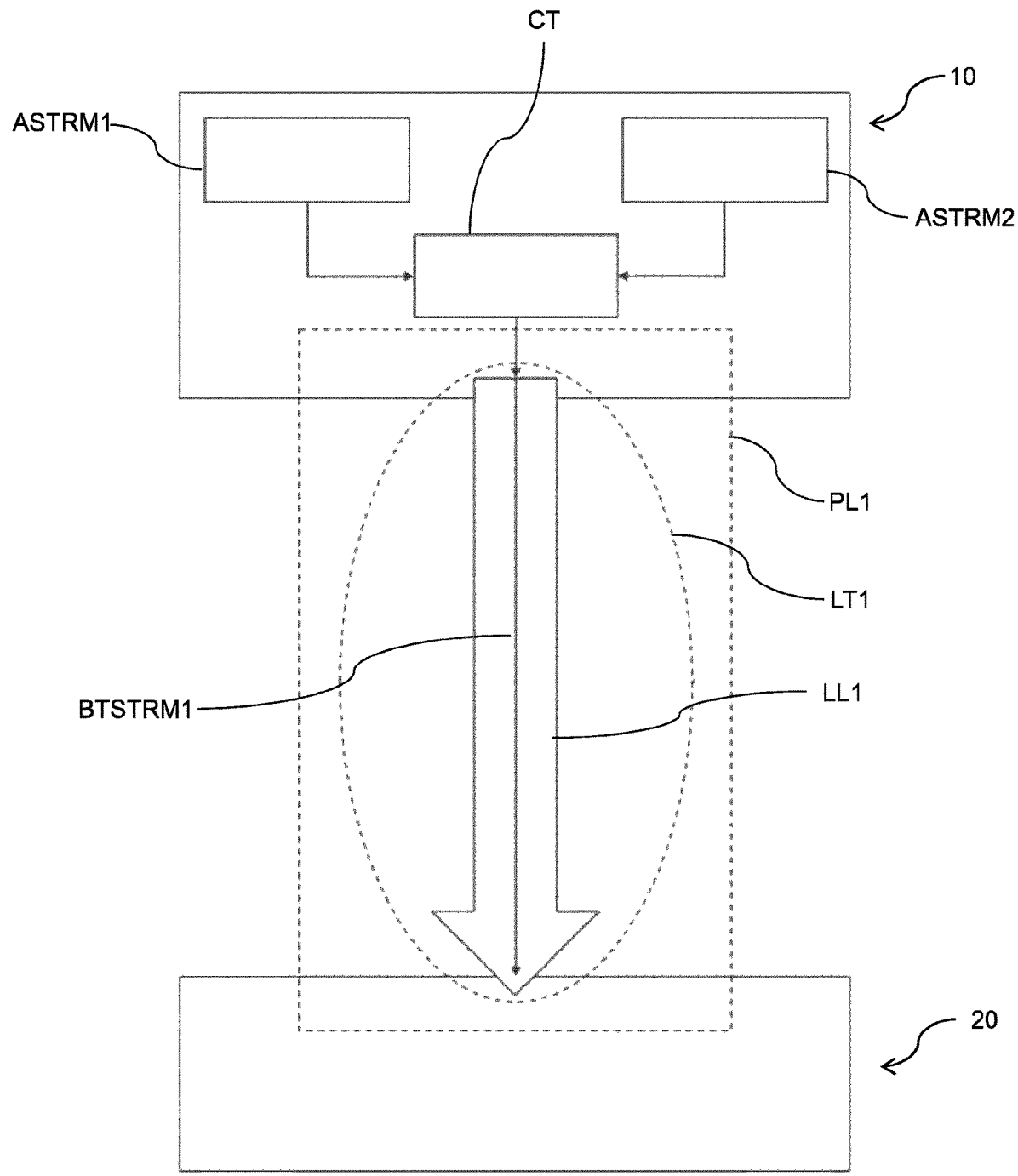
Figure 22:
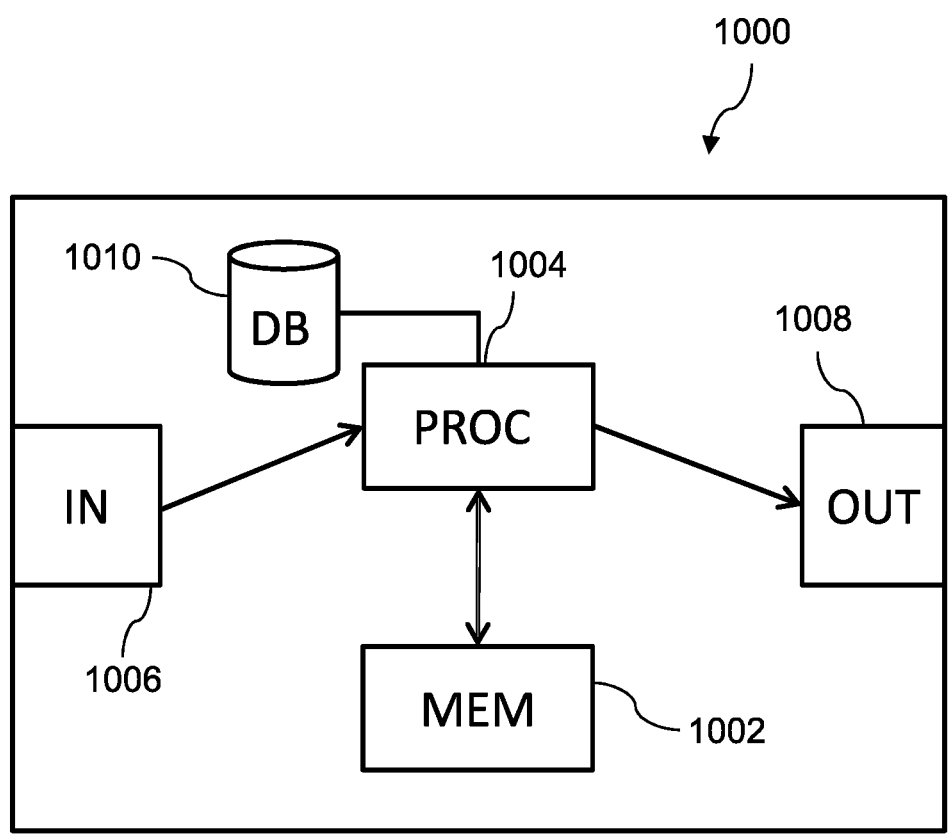

FIG. 7, illustrates an example of method steps according to a first mode of the disclosure;

FIG. 8 illustrates a flowchart of method steps according to a first mode of the disclosure;

FIG. 9 illustrates an example of structure of a Bluetooth data packet according to the disclosure;

FIG. 10 illustrates method steps according to a second mode of the disclosure;

FIG. 11 illustrates a flowchart of method steps according to a third mode of the disclosure;

FIG. 12 illustrates method steps according to the third mode of the disclosure;

FIG. 13 illustrates a Bluetooth communication link according to the third mode of the disclosure;

FIG. 14 illustrates a flowchart of method steps according to a fourth mode of the disclosure;

FIG. 15 illustrates method steps according to the fourth mode of the disclosure;

FIG. 16 illustrates a Bluetooth communication link according to the fourth mode of the disclosure;

FIG. 17 illustrates a flowchart of method steps according to a fifth mode of the disclosure;

FIG. 18 illustrates Bluetooth communication links according to the fifth mode of the disclosure;

FIG. 19 illustrates a flowchart of method steps according to a sixth mode of the disclosure;

FIG. 20 illustrates method steps according to the sixth mode of the disclosure;

FIG. 21 illustrates a Bluetooth communication link according to the sixth mode of the disclosure; and FIG. 22 illustrates the structure of a circuit according to modes of the disclosure.

A description of the modes is now given.

FIG. 7 illustrates simplified method steps for transmitting an audio stream over a Bluetooth communication link, according to a first embodiment of the disclosure.

A method according to said first mode comprises encoding audio data AD as an encoded audio bitstream, said encoded audio bitstream being provided by an audio streaming application 40 to a sink device 20.

For instance, said audio streaming application is an audio application or a gaming application (e.g. on a remote server). For instance, said sink device 20 is a loudspeaker or comprises wearable headphones.

The audio data AD is provided to the sink device 20 over a Bluetooth stack BS, said Bluetooth stack BS being included in a source device 10, e.g. a smartphone.

Herein, a Bluetooth stack BS refers to an implementation of a Bluetooth protocol stack, such as an embedded system implementation of the source device 10.

In an mode, the Bluetooth stack BS comprises a microcontroller and/or a chipset with an operating system and is configured to support various protocols such as L2CAP and AVDTP protocols, as is described hereafter.

During step S1, the audio streaming application 40 transmits the audio data AD to the source device 10 and said audio data is sent by the source device 10 directly to its Bluetooth stack BS, without modification of the audio data (i.e. without going through the audio server of the source device).

This allows the streaming application of the audio streaming application 40 to provide the audio data AD to the Bluetooth stack BS without requiring decoding encoding and/or (re)sampling by an intermediary device/server.

During step S2, the audio data AD received by the Bluetooth stack BS is packetized into a packetized audio data PAD.

In an mode, at least one of the audio data AD and the packetized audio data PAD is a Bluetooth data packet, which can be transmitted using a Bluetooth wireless audio link.

During step S3, the source device 10 transmits the packetized audio data PAD to the sink device 20, said transmitting being carried out over one or more Bluetooth audio streams.

During step S4, the sink device 20 decodes the received packetized audio data PAD and sends the decoded data under the form of an audio output OUT, for instance, a PCM signal or broadcast music.

FIG. 8 illustrates a flowchart of method steps according to the first mode of the disclosure.

Upon receipt of audio data AD1, and in particular of an encoded audio bitstream, through an input IN of the source device 10, the streaming application 40 directly provides said audio data AD1 to the Bluetooth stack BS of the source device 10.

This allows bypassing any mixing, resampling and/or encoding step that could be carried out over AD1 by the source device 10 or by an audio server 30 which could be comprised in the source device 10.

The audio data AD1 is configured by the source device 10 using the audio codec configuration and the sampling rate of the audio stream of the streaming application 40 running on the source device 10. While providing the audio data AD1 to the Bluetooth stack BS, the Bluetooth stack BS packetizes it and transmits it to a third-party device, and here specifically, to the sink device 20.

In particular, the audio data AD1 is packetized into a configured Bluetooth audio stream using the audio codec configuration and the sampling rate of the audio stream of the streaming application 40.

Preferably, the packetized audio data or the configured Bluetooth audio stream is transmitted using a pre-established link, here a Bluetooth communication link L1. The Bluetooth communication link L1 can include one or more Bluetooth physical links and Bluetooth logical links, established or pre-established between the source device 10 and the sink device 20.

Upon receipt, the packetized audio data is decoded by the sink device 20. Subsequently, the decoded packet can be broadcast or streamed through an output OUT of the sink device 20.

This allows avoiding lossy transmission and/or compression during any of the aforementioned steps. In particular, this allows bypassing the use of an audio server.

FIG. 9 illustrates an example of a structure of a Bluetooth data packet according to the disclosure, and more specifically, an example of such a structure for transmitting data using a Bluetooth communication link.

As illustrated, a Bluetooth data packet BTDP comprises several layers, packets, packet data units, frames and/or bitstreams. In particular, the Bluetooth data packet BTDP comprises a logical link control and adaptation protocol, called L2CAP, corresponding to a protocol data unit, called PDU. The L2CAP defines a protocol layer of the Bluetooth data packet BTDP for exchanging data between two channel identifiers, called CIDs.

Advantageously, the L2CAP also defines a link manager layer which implements one or more Bluetooth transport protocols. The L2CAP further enables segmenting data packets, assembling data packets, reassembling data packets, and/or multiplexing.

The L2CAP protocol further allows establishing a logical link between a Bluetooth chip of a device. The parameters of the L2CAP protocol may depend on the features of the source device, such as its ability to support other protocols, etc.

Preferably, the L2CAP protocol comprises an Audio/Video Distribution Transport Protocol, called AVDTP, which is a Bluetooth audio data transport protocol. An AVDTP protocol defines binary transactions between several Bluetooth devices and allows establishing an audio stream and/or a video stream between two stream endpoints, called SEPs.

Advantageously, the AVDTP protocol is configured for setting up a stream and for streaming an audio stream using the L2CAP protocol. The AVDTP protocol further allows a negotiation of the stream parameters and can manage an audio stream by itself.

The AVDTP protocol and the L2CAP protocol enable the exchange of data over a Bluetooth communication link, for instance between a source device and a sink device.

As illustrated, the AVDTP protocol comprises a media payload, called container CT, the container CT itself comprising an encoded frame ENC.

Preferably, the container CT comprises a media payload header and one or more encoded frames.

Herein, the container CT defines a physical bitstream and at least one encoded frame ENC defines a logical bitstream. The physical bitstream may contain both encoded data and associated metadata.

Herein, at least one encoded frame corresponds to audio data which is encoded using an Advanced Audio Coding codec, or AAC codec. The AAC codec is an audio coding standard for lossy digital audio compression, which advantageously results in a better sound quality than what can be achieved with a MP3 codec at the same bit rate.

FIG. 10 illustrates method steps according to a second mode of the disclosure.

The method steps of the second mode allow transmitting an audio stream over a Bluetooth communication link similarly to the first mode, but so that said transmitting is performed upon a successful negotiation of the audio codec configuration and of the sampling rate.

During step S10, a Bluetooth communication link is open, that is, established between the source device 10 and the sink device 20. When a streaming application running on the source device 10 is ready to send audio data, said streaming application can request the opening of a new stream. Alternatively, or simultaneously, a reconfiguration of an existing stream can be requested when opening the Bluetooth communication link.

While establishing the Bluetooth communication link, an optional negotiation phase can be carried out during a step S15.

Said negotiation phase comprises checking if one or more parameters of the stream are supported by the sink device 20. For instance, said one or more parameters are passed as arguments of the stream being opened or reconfigured.

Said one or more parameters comprise at least one audio codec configuration and one sampling rate of the audio stream of the streaming application running on the source device 10. The required codec and the sampling rate can be passed as an argument of the stream.

During step S15, and if the sink device 20 does not support the audio codec configuration and/or the sampling rate, the underlying request for opening the new stream of for reconfiguring the existing stream can be rejected during a step S20.

During step S15, and if the sink device 20 supports the codec and the sampling rate, the request is accepted and the source device 10 carries out the following steps, including step S40, as described hereafter.

During step S40, a configuration of the new stream is carried out or, if appropriate, a reconfiguration of the existing stream, using the one or more parameters. In particular, said configuration is carried out using the audio codec configuration and the sampling rate of the audio stream of the streaming application.

Preferably, a Host Controller Interface, called HCI, of the source device 10 is used to carry out step S40.

Herein, an HCI is an optional standard interface between a Controller subsystem and a Host subsystem. In Bluetooth devices having simple functionality (e.g., headsets), the host and the controller can be implemented on a same microprocessor or as an internal software interface. The HCI of the source device 10 can perform the configuration or the reconfiguration of the stream during step S40, which is for instance a Bluetooth A2DP stream.

During step S50, the source device 10 receives the audio stream from the streaming application.

During step S60, the source device packetizes the received audio stream into the Bluetooth audio stream which has been configured during step S40 using the audio codec configuration and the sampling rate.

During step S70, the source device 10 transmits the Bluetooth audio stream comprising the packetized received audio stream to the sink device 20.

FIG. 11 illustrates a flowchart of method steps according to a third mode of the disclosure. In this third mode, not only the audio data AD1 is received by the Bluetooth stack BS from the input IN of the source device 10, but also audio data AD2 sent by an audio server 30 comprised in the source device 10 (said audio data AD2 may be for instance of system audio notification).

Both AD1 and AD2 are then packetized into a configured Bluetooth audio stream using the audio codec configuration and the sampling rate of the audio stream of the streaming application 40.

The configured Bluetooth audio stream is then transmitted from the source device 10 to the sink device 20 using an established Bluetooth link L1, and both packetized audio data AD1 and AD2 are unpacketized by the sink device 20, and optionally, decoded in one or more distinct steps before being rendered, broadcast or further streamed through the output OUT.

If, after the unpacketizing, the audio data is decoded during separate steps by the sink device 20, the decoded data can be subsequently mixed or multiplexed before being rendered, broadcast or further streamed through the output OUT (the Bluetooth audio stream may then additionally comprises information on the way to mix data, e.g. the respective percentage/value of volume for each audio data on the sink device side).

This allows combining multiple audio sources. Advantageously, and for instance, this allows receiving audio notifications, e.g. notifications from a social media application installed on the source device 10, while simultaneously listening to a music file provided by a streaming application 40 running on the source device 10.

Preferably, when more than one or more than two audio sources are present, the corresponding audio data may be mixed in at least one audio server and resampled using the sampling rate of the sink device 20, which corresponds to the sampling rate of the streaming application 40 when an existing stream has been reconfigured.

In other words, the shown mode allows several audio sources, including the streaming application 40 and at least one audio server 30, to use a simplified audio link path for the streaming application.

FIG. 12 illustrates method steps for transmitting an audio stream over a Bluetooth communication link, according to the third mode of the disclosure.

In particular, the method steps of the third mode allow transmitting an audio stream over a Bluetooth communication link similarly to the first and second modes, except that the reception step S50 is replaced by two steps S51 and S52 which are either carried out simultaneously or successively. Step S51 comprising receiving, by the source device 10, first audio data AD1 from the streaming application 40 and step S52 comprising receiving, by the source device 10, second audio data AD2 from the audio server 30. FIG. 13 illustrates a Bluetooth communication link for carrying out the third mode of the disclosure.

In particular, a Bluetooth audio stream BTSTRM, corresponding to the packetization of two audio streams, is transmitted from the source device 10 to the sink device 20, said Bluetooth audio stream BTSTRM comprising a first contribution ASTRM1 and a second contribution ASTRM2. Preferably; said first contribution ASTRM1 is an audio stream provided by the streaming application running on the source device 10 and said second contribution ASTRM2 is an audio stream provided by an audio server.

Preferably, the Bluetooth audio stream BTSTRM is an A2DP Bluetooth audio stream.

The Bluetooth audio stream BTSTRM is enabled by a logical link LL1, and preferably an ACL-U logical link.

Herein, a logical link is a link which defines what type of information is carried by the Bluetooth audio stream BTSTRM. For instance, said logical link carries control data or user data, said user data being subdivided into framed data and unframed data.

Preferably, the logical link LL1 is carried by a logical transport LT1, and preferably an ACL logical transport.

Herein, a logical transport is a wireless transport which defines what type of characteristics is carried by the stream.

Moreover, a logical transport can support one or more logical links and said characteristics comprise casting type, scheduling behavior, acknowledgment/repeat mechanisms, flow control, and sequence numbering, among others. In particular, Bluetooth logical transports can carry different types of logical links, depending on the type of logical transport, and when several Bluetooth logical links are used, said Bluetooth logical links can be multiplexed onto the same logical transport.

Examples of logical transports include asynchronous connection-oriented, or ACL, synchronous connection-oriented, or SCO, extended synchronous connection-oriented, or eSCO, active slave broadcast, or ASB, connectionless slave broadcast, or CSB, LE asynchronous connection, or LE ACL, LE advertising broadcast, or ADVB, LE periodic advertising broadcast, or PADVB, transports. Other examples include LE connected isochronous and broadcast isochronous streams.

The Bluetooth audio stream BTSTRM, the logical link LL1 and the logical transport LT1 define a communication link. Thus, the communication link is defined by at least one physical link between two devices. Further, said communication link includes one or more physical links, and defines the wireless communication between two devices and, in the present case, between the source device 10 and the sink device 20.

The Bluetooth audio stream BTSTRM, the logical link LL1 and the logical transport LT1 define a physical link PL1, such as a BR/EDR physical link.

Herein, a physical link is a BR/EDR physical link or a LE physical link, which allows enabling a baseband connection between wireless devices. BR/EDR physical links include BR/EDR active physical links and BR/EDR connectionless slave broadcast physical links. LE physical links include LE active physical links, LE advertising physical links, LE periodic physical links, and LE isochronous physical links.

Preferably, the physical link PL1 is an active BR/EDR physical link or a LE isochronous physical link.

FIG. 14 illustrates a flowchart of method steps according to a fourth mode of the disclosure.

In this fourth mode, the audio data AD1 being received from the streaming application 40 is packetized using the audio codec configuration and the sampling rate of the streaming application 40 into the Bluetooth audio stream configured. Simultaneously or successively, audio data AD2 which corresponds to a second audio stream coming from the audio server 30 is packetized into said Bluetooth audio stream using the audio codec configuration and the sampling rate of the second audio stream.

As an alternative, the two audio streams use the same audio codec configuration and sampling rate. It is then possible to transmit these two audio streams over a same Bluetooth communication link L1, as shown.

When AD1 and of AD2 are packetized into the same Bluetooth audio stream, they can be later unpacketized and decoded by the sink device 20. In particular, the unpacketizing and the decoding can be carried out simultaneously or successively for each of AD1 and of AD2.

FIG. 15 illustrates method steps according to the fourth mode of the disclosure. In particular, these method steps allow transmitting two audio streams over a Bluetooth communication link.

During step S10, and as described previously, a Bluetooth link is opened or pre-established between the source device and the sink device.

Preferably, this is carried out when the streaming application running on the source device requests to open at least one audio stream.

During step S41, said at least one Bluetooth audio stream is configured or reconfigured with an audio codec configuration and a sampling rate of the streaming application 40.

During step S42, which is carried out either successively or simultaneously with respect to step S41, at least one another Bluetooth audio stream is configured or reconfigured with an audio codec configuration and a sampling rate of the audio server 30, or with the audio codec configuration and the sampling rate of the streaming application.

During step S51, the source device 10 receives the audio stream from the streaming application 40, called first audio stream. During step S52, which is carried out either successively or simultaneously with respect to step S51, the source device receives the audio stream from the audio server 30, called second audio stream.

During step S61, the source device packetizes the first audio stream into the Bluetooth audio stream which has been configured during step S41 using the audio codec configuration and the sampling rate of the streaming application.

During an optional step S62, which is carried out either successively or simultaneously with respect to step S61, the source device packetizes the second audio stream into said Bluetooth audio stream.

During step S70, the source device 10 transmits the Bluetooth audio streams comprising the packetized first and second audio streams to the sink device 20.

As an alternative to step S70, steps S61 and S62 may be followed by two distinct transmission steps S71 and S72 which are not represented. In such a situation, the first and second packetized audio streams can be transmitted through separate logical links.

FIG. 16 illustrates a Bluetooth communication link for carrying out the fourth mode of the disclosure.

As illustrated, two Bluetooth audio streams BTSTRM1 and BTSTRM2 are transmitted from the source device 10 to the sink device 20 over a single Bluetooth communication link.

In particular, the first Bluetooth audio stream BTSTRM1 comprises a first contribution ASTRM1 and the second Bluetooth audio stream BTSTRM2 comprises a second contribution ASTRM2, said first contribution ASTRM1 being the audio stream provided by the streaming application 40 running on the source device 10 and the second contribution ASTRM2 being the audio stream provided by the audio server 30.

Preferably, the Bluetooth audio streams BTSTRM1 and BTSTRM2 are each A2DP Bluetooth audio streams, said Bluetooth audio streams being enabled by one logical link LL1, such as an ACL-U logical link, carried by one logical transport LT1, such as an ACL logical transport. The Bluetooth audio streams BTSTRM1 and BTSTRM2, the logical link LL1 and the logical transport LT1 define a physical link PL1, preferably a BR/EDR active physical link.

FIG. 17 illustrates a flowchart of method steps according to a fifth mode of the disclosure.

In particular, the method steps of the fifth mode are similar to those of the fourth mode except that, in addition to the Bluetooth communication link L1, at least one another Bluetooth logical link LL2 is open between the source device 10 and the sink device 20. This allows transmitting one or more audio streams over two distinct Bluetooth logical links.

For instance, said at least another link LL2 is opened during step S10 when the streaming application 40 requests opening a stream.

FIG. 18 illustrates two Bluetooth communication links for carrying out the fifth mode of the disclosure.

As illustrated, two Bluetooth audio streams BTSTRM1 and BTSTRM2 are transmitted from the source device 10 to the sink device 20. The first Bluetooth audio stream BTSTRM1 comprises a first contribution ASTRM1, and the second Bluetooth audio stream BTSTRM2 comprises a second contribution ASTRM2. Again, said first contribution ASTRM1 is the audio stream provided by the streaming application 40 and said second contribution ASTRM2 is the audio stream provided by the audio server 30.

The Bluetooth audio stream BTSTRM1 is enabled by a logical link LL1, such as an ACL-U logical link, while the Bluetooth audio stream BTSTRM2 is enabled by another logical link LL2, such as a LE-S logical link.

The logical link LL1 is carried by a logical transport LT1, such as an ACL logical transport, while the logical link LL2 is carried by another logical transport LT2, such as a LE connected isochronous logical transport.

The Bluetooth audio stream BTSTRM1, the logical link LL1 and the logical transport LT1 define a physical link PL1, which is preferably a BR/EDR active physical link. The Bluetooth audio stream BTSTRM2, the logical link LL2 and the logical transport LT2 define a physical link PL2, which is preferably a LE isochronous physical link.

FIG. 19 illustrates a flowchart of method steps according to a sixth mode of the disclosure.

In particular, these method steps are similar to those of the first, second and third modes except that the packetizing of the audio data AD1 and AD2 is carried out by wrapping said audio data in a container, such as an Ogg-container. This results in a physical bitstream which can subsequently be packetized and transmitted over a Bluetooth communication link established between the source device 10 and the sink device 20.

After said container, or physical bitstream, is received by the sink device 20, it is subsequently unpacketized and unwrapped. Subsequent decoding steps can then be carried out, one decoding step being carried out for the logical bitstream of the physical bitstream which corresponds to the streaming application, and another decoding step being carried out for the logical bitstream of the physical bitstream which corresponds to the audio server. The two decoding steps can be carried out separately or together as a single decoding step.

FIG. 20 illustrates method steps corresponding to the sixth mode of the disclosure.

Specifically, after receiving the first audio stream during step S51 and after receiving the second audio stream during step S52, the two audio streams are packetized into a container CT during a step S55, then packetized during a step S65, before eventually being transmitted during a step S75 to the sink device 20.

FIG. 21 illustrates a Bluetooth communication link for carrying out the sixth mode of the disclosure.

Specifically, a Bluetooth audio stream BTSTRM1 is transmitted from the source device 10 to the sink device 20, said Bluetooth audio stream BTSTRM1 comprising a first contribution ASTRM1 and a second contribution ASTRM2. Said first contribution ASTRM1 is an audio stream provided by the streaming application running on the source device 10 and said second contribution ASTRM2 is an audio stream provided by an audio server.

In the present case, the two contributions ASTRM1 and ASTRM2 are encapsulated in a container CT before being transmitted from the source device 10 to the sink device 20.

Again, the Bluetooth communication link defined by the audio stream BTSTRM1, the logical link LL1 and the logical transport LT1 can include one or more physical links and defines the wireless communication between the source device 10 and the sink device 20.

Again, and preferably, the Bluetooth audio stream BTSTRM1, the logical link LL1 and the logical transport LT1 define a physical link PL1, such as a BR/EDR physical link.

Advantageously, the container CT is here an Ogg-Vorbis container. While Bluetooth standards merely allow packetizing audio data in a single audio stream, using an Ogg-Vorbis container allows having multiple audio streams in a same packet. In other words, using Ogg-Vorbis containers, or Ogg stream containers, allows encapsulating one or more logical bitstreams.

Moreover, this allows providing the sink device 20 the required information to properly separate the audio data back without relying on decoding to find the corresponding packet boundaries. In this case, the codec used to encode the audio data provided by the audio server 30 should be compatible with the container CT.

Once encoded, a logical bitstream coming from the audio server can be wrapped into the container with the logical bitstream of the streaming application. Both logical bitstreams can then be sent within a same packet to the sink device 20. Said sink device 20 can then unwrap the two logical bitstreams, decode them separately using their respective codecs, and carrying out a mixing of the decoded result to provide a single stream to be output.

FIG. 22 shows a device 1000 adapted for implementing a method according to an mode of the disclosure, and specifically, a method for transmitting or for receiving an audio stream over a Bluetooth communication link when managing a plurality of multimedia devices.

In an mode, the device 1000 comprises a Bluetooth chip, which is integrated in an electronic circuit or in any type of electronic device, such as the source device or the sink device.

As illustrated, the device 1000 comprises a storage space 1002, for example a memory MEM including a random access memory 1002. The storage space 1002 can also be a nonvolatile memory such as a ROM or a Flash memory, and can provide a recording medium, said recording medium being configured to store a computer program product.

The device 1000 further comprises a processing unit 1004 equipped for example with a circuit which includes or is a processor PROC. The processing unit 1004 can be controlled by a program, such as a computer program implementing the managing method as described herein with reference to any of the previous figures. The processing unit 1004 can store instructions for performing the steps described with reference to any of the aforementioned modes.

The device 1000 may also comprise a database 1010 for storing data like audio data, an audio stream, a container or any bitstream. The database 1010 can further store any information such as an audio codec configuration or a sampling rate.

The device 1000 further comprises an input interface 1006 and an output interface 1008, which are configured for establishing a communication to and from the multimedia device to external devices. For instance, the output interface 1008 can be a communication module enabling the device 1000 to connect via Bluetooth and for exchanging data with other devices by Bluetooth. The communication module preferably includes a Bluetooth communication module.

According to an mode, the Bluetooth chip is configured to implement one or more of the steps that have been described in the present disclosure.

Herein, expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

While there has been illustrated and described modes of the present invention, it will be understood by those skilled in the art that various other modifications may be made, and equivalents may be substituted, without departing from the true scope of the present invention. Additionally, many modifications may be made to adapt a particular situation to the teachings of modes of the present invention without departing from the scope of the invention. Furthermore, an mode of the present invention may not include all of the features described above. Therefore, it is intended that the present invention not be limited to the particular modes disclosed, but that the invention includes all modes falling within the scope of the appended claims.

A person skilled in the art will readily appreciate that various parameters disclosed in the description may be modified and that various modes disclosed and/or claimed may be combined without departing from the scope of the invention.

Further, the present subject disclosure comprises embodiments according to the following clauses A to R:

A. A method for transmitting an audio stream over a Bluetooth communication link, the method being carried out by a source device and comprising:
  receiving an audio codec configuration and a sampling rate of a first audio stream, said first audio stream coming from a streaming application running on the source device;
  configuring a first Bluetooth audio stream between the source device and a sink device using the received audio codec configuration and sampling rate;
  receiving the first audio stream from the streaming application;
  packetizing the received first audio stream into said first Bluetooth audio stream; and
  transmitting the first Bluetooth audio stream to the sink device over the Bluetooth communication link, the transmitted Bluetooth audio stream comprising the packetized received audio stream.

B. The method according to clause A, wherein the receiving of the first audio stream from the streaming application is carried out upon receipt of an unmodified bitstream from the streaming application.

C. The method according to any one of clause A or B, further comprising:
  receiving at least a second audio stream (AD2), said second audio stream being different from the first audio stream, from an audio server (30); and
  transmitting said received second audio stream to the sink device over the Bluetooth communication link.

D. The method according to claim C, wherein the first Bluetooth audio stream is of a multi-contribution type, the method further comprising packetizing the received second audio stream into the first Bluetooth audio stream using an audio codec configuration and a sampling rate of the second audio stream.

E. The method according to claim C, comprising wrapping the first audio stream received from the streaming application and/or the received second audio stream into a container (CT), said container being placed into the first Bluetooth audio stream.

F. The method according to claim E wherein the container is an Ogg-Vorbis container.

G. The method according to clause E, wherein the first audio stream or the second audio stream is a Vorbis encoded stream, or the first audio stream and the second audio streams are Vorbis encoded streams.

H. The method according to clause C, further comprising:
  packetizing the received second audio stream into a second Bluetooth audio stream, said second Bluetooth audio stream being distinct from the first Bluetooth audio stream, and
  transmitting said second Bluetooth audio stream to the sink device over the Bluetooth communication link, the second Bluetooth audio stream being multiplexed with the first Bluetooth audio stream.

I. The method according to clause H, wherein the first Bluetooth audio stream or the second Bluetooth audio stream is transmitted over a BR/EDR link of the Bluetooth communication link, or the first Bluetooth audio stream and the second Bluetooth audio streams are transmitted over a BR/EDR link of the Bluetooth communication link.

J. The method according to clause H, wherein the second Bluetooth audio stream is transmitted over a BLE link of the Bluetooth communication link.

K. The method according to any of the preceding clauses, wherein the transmitting of the first Bluetooth audio stream is performed upon a successful negotiation, with the sink device, of the audio codec configuration and of the sampling rate.

L. A computer program product comprising a computer readable medium having stored thereon computer program instructions loadable into a computing device and adapted to—when loaded into and executed by said computing device—cause the computed device to perform the steps of a method according to clauses A to K.

M. A method for receiving a Bluetooth audio stream over a Bluetooth communication link, the method being carried out by a sink device, wherein the method comprises:
  receiving a plurality of Bluetooth audio streams transmitted by a source device over the Bluetooth communication link;
  mixing the plurality of received Bluetooth audio streams into a mixed audio stream; and
  rendering the mixed audio stream,
  at least one first Bluetooth audio stream among said received plurality of Bluetooth audio streams comprising a packetized audio stream, the packetizing of said audio stream into the first Bluetooth audio stream being performed by the source device, the first Bluetooth audio stream being configured between the source device and the sink device by the source device using an audio codec configuration and a sampling rate of a first audio stream, said audio codec configuration and said sampling rate being received by the source device, said first audio stream coming from a streaming application running on the source device, the transmitting of the first Bluetooth audio stream being performed by the source device upon a successful negotiation, with the sink device, of the audio codec configuration and of the sampling rate.

N. The method according to clause M, further comprising:
receiving, from the source device, at least a second audio stream over the Bluetooth communication link,
said second audio stream being received by the source device from an audio server, said second audio stream being different from the first audio stream.

O. The method according to clause N, further comprising:
receiving, from the source device, a second Bluetooth audio stream device over the Bluetooth communication link,
the second Bluetooth audio stream being multiplexed with the first Bluetooth audio stream, the received second audio stream being packetized by the source device into the second Bluetooth audio stream, said second Bluetooth audio stream being distinct from the first Bluetooth audio stream.

P. A source device for transmitting an audio stream over a Bluetooth communication link, said source device being configured to:
receive an audio codec configuration and a sampling rate of a first audio stream of a streaming application running on the source device;
configure a first Bluetooth audio stream between the source device and a sink device, using the received audio codec configuration and sampling rate;
receive the first audio stream from the streaming application;
packetize the received audio stream into said first Bluetooth audio stream; and
transmit the first Bluetooth audio stream to the sink device, the first Bluetooth audio stream comprising the packetized received audio stream.

Q. A sink device for receiving a Bluetooth audio stream over a Bluetooth communication link, said sink device being configured to:
receive a plurality of Bluetooth audio streams transmitted by a source device over the Bluetooth communication link;
mix the plurality of received Bluetooth audio streams into a mixed audio stream; and
render the mixed audio stream,
at least one Bluetooth audio stream among said received plurality of Bluetooth audio streams comprising a packetized audio stream, the packetizing of said audio stream into said at least one Bluetooth audio stream being performed by the source device, the at least one Bluetooth audio stream being configured between the source device and the sink device by the source device using an audio codec configuration and a sampling rate of a first audio stream, said audio codec configuration and said sampling rate being received by the source device, said first audio stream coming from a streaming application running on the source device.

R. A system for transmitting and receiving a Bluetooth audio stream over a Bluetooth communication link, said system comprising a source device according to clause P and a sink device according to clause Q.

The invention claimed is:

1. A method for operating a Bluetooth device, the method comprising:
transporting audio information over a Bluetooth communication link established with a second device;
determining, upon a change of value of an operational parameter in either the Bluetooth device or the second device, a new operating mode for said Bluetooth communication link, wherein the operational parameter is a launch of a gaming application;
modifying a configuration parameter of said Bluetooth communication link based on the new operating mode; and
transporting audio information on said Bluetooth communication link according to the modified configuration parameter.

2. The method of claim 1, wherein the operational parameter is associated with an operating system running on the Bluetooth device or the second device.

3. The method of claim 1, wherein the operational parameter is associated with an application running on the Bluetooth device or the second device.

4. The method of claim 1, wherein the modifying of the configuration parameter is performed by a Bluetooth Host.

5. The method of claim 1, wherein the modifying of the configuration parameter is performed by a Bluetooth Controller.

6. The method of claim 1, wherein the configuration parameter is one of:
an audio configuration parameter, or
a Bluetooth connection parameter.

7. The method of claim 6, wherein the configuration parameter is one audio configuration parameter among:
a type of codec,
a parameter relative to a codec,
a type of data,
an audio channel selection parameter, or
a sampling rate parameter.

8. The method of claim 6, wherein the configuration parameter is one Bluetooth connection parameter among:
a Flush Timeout parameter,
a channel type parameter,
a quality of service parameter,
a number of retransmission parameter,
a parameter among BLE link parameters,
a packet type parameter, or
a Maximum Transmission Unit (MTU) parameter.

9. A Bluetooth device comprising a Bluetooth chip, a processor and a memory configured to:
transport audio information over a Bluetooth communication link established with a second device;
determine, upon a change of value of an operational parameter in either the Bluetooth device or the second device, a new operating mode for said Bluetooth communication link, wherein the operational parameter is a launch of a gaming application;
modify a configuration parameter of said Bluetooth communication link based on the new operating mode; and
transport audio information on said Bluetooth communication link according to the modified configuration parameter.

10. The Bluetooth device of claim 9, wherein the operational parameter is associated with an operating system of the Bluetooth device or the second device.

11. The Bluetooth device of claim 9, wherein the operational parameter is associated with an application running on the Bluetooth device or the second device.

12. The Bluetooth device of claim 9, further comprising a Bluetooth Controller and wherein the modifying of the configuration parameter is performed by the Bluetooth Controller.

13. The Bluetooth device of claim 9, wherein the configuration parameter is one of:
an audio configuration parameter, or
a Bluetooth connection parameter.

14. The Bluetooth device of claim 13, wherein the operational parameter is one audio configuration parameter among:
- a type of codec,
- a parameter relative to a codec,
- a type of data,
- an audio channel selection parameter, or
- a sampling rate parameter.

15. The Bluetooth device as set forth in claim 13, wherein the operational parameter is one Bluetooth connection parameter among:
- a Flush Timeout parameter,
- a channel type parameter,
- a quality of service parameter,
- a number of retransmission parameter,
- a parameter among BLE link parameters,
- a packet type parameter, or
- a Maximum Transmission Unit (MTU) parameter.

16. A non-transitory, computer-readable storage medium, having stored there on a computer program comprising program instructions, the computer program being loadable into a data-processing unit of a first device and adapted to cause the data-processing unit to carry out a method comprising:
- transporting audio information over a Bluetooth communication link established with a second device;
- determining, upon a change of value of an operational parameter in either the first device or the second device, a new operating mode for said Bluetooth communication link, wherein the operational parameter is a launch of a gaming application;
- modifying a configuration parameter of said Bluetooth communication link based on the new operating mode; and
- transporting audio information on said Bluetooth communication link according to the modified configuration parameter.

* * * * *